United States Patent
Mahood et al.

(10) Patent No.: US 11,462,865 B2
(45) Date of Patent: Oct. 4, 2022

(54) USER CONFIGURABLE ELECTRIC POWER DISTRIBUTION APPARATUS

(71) Applicants: Daniel J. Mahood, Chapel Hill, NC (US); Kyle M. Warner, Richmond, VA (US)

(72) Inventors: Daniel J. Mahood, Chapel Hill, NC (US); Kyle M. Warner, Richmond, VA (US)

(*) Notice: Subject to any disclaimer, the term of this patent is extended or adjusted under 35 U.S.C. 154(b) by 406 days.

(21) Appl. No.: 16/677,592

(22) Filed: Nov. 7, 2019

(65) Prior Publication Data
US 2021/0143587 A1   May 13, 2021

(51) Int. Cl.
| | |
|---|---|
| *H01R 13/713* | (2006.01) |
| *H01R 24/66* | (2011.01) |
| *H01R 24/76* | (2011.01) |
| *H01R 31/06* | (2006.01) |
| *H01R 31/02* | (2006.01) |

(52) U.S. Cl.
CPC ....... *H01R 13/7135* (2013.01); *H01R 13/713* (2013.01); *H01R 24/66* (2013.01); *H01R 24/76* (2013.01); *H01R 31/02* (2013.01); *H01R 31/06* (2013.01)

(58) Field of Classification Search
CPC ...... H01R 13/713; H01R 24/76; H01R 24/66; H01R 13/7135; H01R 31/02; H01R 31/06; H01R 31/065; H01R 25/006; H02G 11/00; H02G 3/0406; G05B 19/02

USPC .......................................................... 361/42
See application file for complete search history.

(56) References Cited

U.S. PATENT DOCUMENTS

| | | | |
|---|---|---|---|
| 5,306,165 | A | 4/1994 | Nadeau |
| 6,281,434 | B1 | 8/2001 | Gretz |
| 6,492,594 | B1 | 12/2002 | Magyar et al. |
| 8,696,368 | B2 | 4/2014 | Quezada |
| 9,083,180 | B2 | 7/2015 | Dodal et al. |
| 9,088,117 | B2 * | 7/2015 | Rosenblum .......... H01R 25/006 |
| 9,312,704 | B2 | 4/2016 | Tinaphong et al. |
| 9,368,982 | B2 | 6/2016 | Jansen et al. |
| 9,509,080 | B1 | 11/2016 | Insalaco |
| 9,525,232 | B1 | 12/2016 | Insalaco |
| 9,531,177 | B1 | 12/2016 | Gretz |
| 10,128,646 | B1 | 11/2018 | Gretz |

(Continued)

*Primary Examiner* — Danny Nguyen
(74) *Attorney, Agent, or Firm* — Robert L. Protheroe

(57) ABSTRACT

Various implementations and configurations of a user configurable electric power distribution apparatus are possible and may comprise: an electrical input unit comprising an electrical plug, wherein the input unit may be pluggable into an existing electrical outlet and may conceal the electrical outlet; an electrical output unit comprising one or more electrical receptacles, wherein the output unit and the input unit are not conjoined, the output unit can be located on a surface when the input unit is plugged into an electrical outlet, and the output unit can be separated by a distance from the input unit; an electrical interconnect, which may be modular, attached to both the input unit and the output unit, wherein electrical power received by the electrical plug may be available at an electrical receptacle comprised by the output unit; an optional ground fault circuit interrupter (GFCI); and an optional one or more USB power ports.

4 Claims, 15 Drawing Sheets

(56) References Cited

U.S. PATENT DOCUMENTS

| | | | |
|---|---|---|---|
| 2009/0212967 A1* | 8/2009 | Bonasia | H02H 3/335 |
| | | | 340/4.32 |
| 2010/0328853 A1 | 12/2010 | Johnson et al. | |
| 2014/0035527 A1* | 2/2014 | Hayashigawa | B60L 53/305 |
| | | | 320/109 |
| 2021/0050695 A1* | 2/2021 | Tsang | H02G 3/0406 |

* cited by examiner

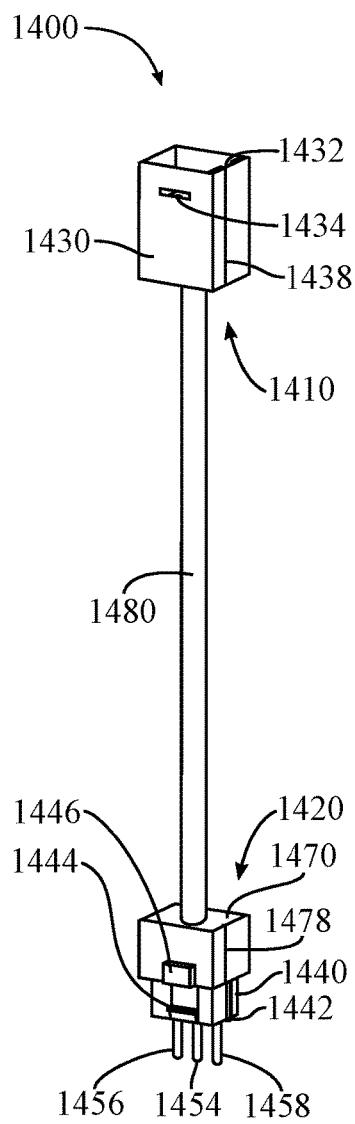
FIG. 9A
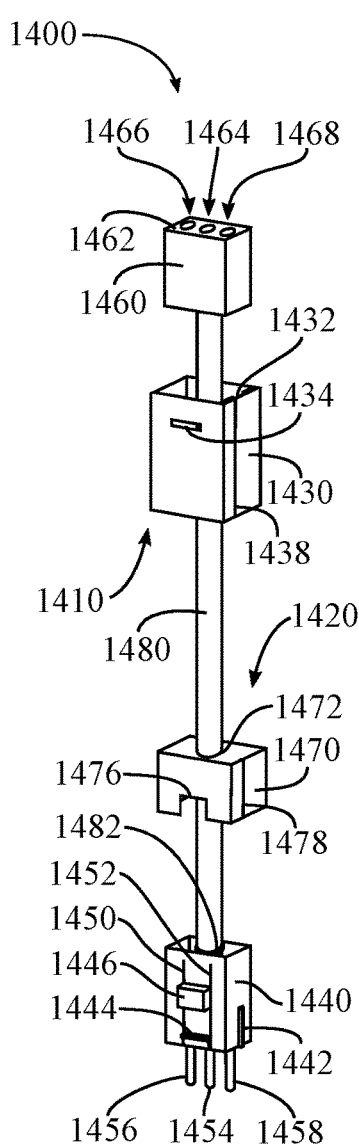
FIG. 9B
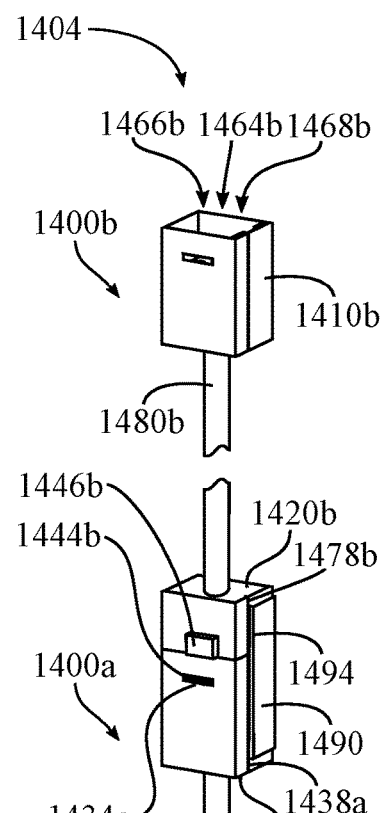
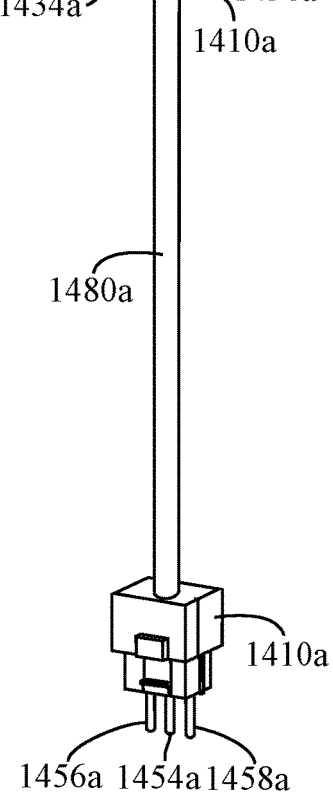
FIG. 9C
FIG. 9D

USER CONFIGURABLE ELECTRIC POWER DISTRIBUTION APPARATUS

CROSS-REFERENCE TO RELATED APPLICATIONS

Not Applicable

BACKGROUND

The present disclosure relates to electrical apparatus for distributing electrical power and more particularly relates to a user configurable electric power distribution apparatus.

SUMMARY

Various implementations of a user configurable electric power distribution apparatus (electrical apparatus) are disclosed. An electrical apparatus of the present disclosure may comprise an electrical input unit (input unit) comprising an electrical plug, wherein the input unit may be pluggable into an existing electrical outlet. In some implementations, the input unit may conceal the electrical outlet when plugged therein. An electrical apparatus may comprise an electrical output unit (output unit) comprising one or more electrical receptacles, wherein: the output unit and the input unit are not conjoined; the output unit can be located on a surface when the input unit is plugged into an electrical outlet; and the output unit can be separated by a distance from the input unit. An electrical apparatus may comprise an electrical interconnect attached to both the input unit and the output unit, wherein electrical power received by the electrical plug may be available at an electrical receptacle comprised by the output unit via an electrical circuit comprising at least portions of the electrical plug, at least portions of the electrical interconnect and at least portions of the electrical receptacle.

In some implementations, an electrical circuit of the electrical apparatus may comprise a ground fault circuit interrupter (GFCI). A GFCI may be configured to interrupt availability of electrical power at an electrical receptacle comprised by an output unit upon an occurrence of a ground fault condition resulting in or affecting an electrical current flowing into an electrical plug of an input unit. An electrical circuit which may electrically connect an electrical plug of an input unit and an electrical receptacle of an output unit may comprise an input circuit portion (input circuit), including electrical conductors and electrical components of the electrical circuit which may reside between the electrical plug and a GCFI. An electrical circuit which may electrically connect an electrical plug of an input unit and an electrical receptacle of an output unit may comprise an output circuit portion (output circuit), including electrical conductors and electrical components of the electrical circuit which may reside between a GFCI and the electrical receptacle, and include electrical conductors and electrical components of the electrical receptacle. Upon an occurrence of a ground fault condition, electrical power available at the electrical plug may be unavailable to the output circuit, as electrical power may be interrupted by the GFCI.

In some implementations, a GFCI may be comprised by an input unit, and can thereby interrupt an availability of electrical power, for example by opening a GFCI switch, to an output circuit which may comprise electrical conductors and components of an electrical interconnect and electrical conductors and components of an output unit including electrical conductors and components of an electrical receptacle therein. In some implementations, an input unit may comprise a GFCI test feature, such as a user depressible button and associated circuitry which may simulate and/or create a ground fault, and a GFCI reset feature, such as a user depressible button which closes a GFCI switch which may have been opened upon a ground fault condition, actual or simulated and/or created by testing, such as by depressing a test button. In some implementations, an input unit may comprise a visual indicator configured to indicate a status of electrical power which may be available at an electrical plug of the input unit and/or at an electrical receptacle(s) an output unit, such as for example, a light emitting diode (LED), wherein by way of an example implementation, no emitted light/color may indicate no power available at the electrical plug of the input unit, a red emitted light/color may indicate an open GFCI switch which may have resulted from an occurrence of a ground fault condition and results in no power being available to an output circuit connected to the input unit, and a green emitted light/color may indicate that power may be available at the electrical plug of an input unit, a GFCI switch may be closed and power may be available at the electrical receptacle(s) of the output unit.

In some implementations, an output unit may be configured to be attached to a surface, such as a surface of a wall. In some implementations, an output unit may configured to be attached to a surface, such as a surface of a wall, via a mounting plate, wherein a mounting plate may be attached to the surface, and the output unit may be attached, such as removably attached, to the mounting plate. In some implementations, an output unit may be attachable/removable to/from a mounting plate without the use of tools. In some implementations, an attachment of an electrical apparatus to a surface, such as a wall surface, may not require a breaching of the surface, such as a creation of a hole in a wall. For example, a mounting plate may be attached to a wall surface using two-sided adhesive strips, such as a 3M Command™ Strips marketed by 3M Corporation. In some implementations, a user may configure an electrical apparatus to relocate availability of an existing power tap, such as an existing electrical outlet, to a location other than the existing outlet and within a physical constraint of an input unit and an output unit interconnected by an electrical interconnect of the electrical apparatus, wherein the availability of power is relocated to a power tap, such as an electrical receptacle, comprised by the output unit of the electrical apparatus, and the electrical apparatus comprises an input unit plugged into the existing outlet.

In some implementations, an output unit may comprise circuitry to convert a portion of electrical power from an alternating current (AC) to a direct current (DC) for delivery via a Universal Serial Bus (USB) power port, such as, a USB port which may provide a 5 volt DC power supply to a device connect thereto, such as for example, a smartphone connected via a USB cable for charging a battery therein. In some implementations, an output unit may comprise a visual indicator, indicating a status of electrical power available at an electrical receptacle and/or a USB power port comprised the output unit. In some implementations, a visual indicator may be comprised by an output unit and may indicate a status of a GFCI comprised by an input unit. In an example implementation, an LED indicator comprised by an output unit may be controlled via a circuit comprised by an input unit comprising a GFCI, wherein the control may be extended from the input unit to the output unit, for example, via electrical conductor(s) comprised by the electrical interconnect.

In some implementations, an electrical apparatus may comprise an electrical interconnect which may be a modular interconnect, such that the modular interconnect may comprise at least one interconnect module and a plurality of modular interconnections, such that the modular interconnections can be connected, disconnected and reconnected. In some implementations, modular interconnections can be connect, disconnected and reconnected without the use of tools. In some implementations a modular interconnect may comprise a straight interconnect module. In some implementations a modular interconnect may comprise an angled interconnect module. In some implementations, a modular interconnect may comprise one or more straight interconnect modules and one or more angled interconnect modules. In some implementations, a modular interconnection may comprise a lock, wherein the lock locks an interconnect plug to an interconnect socket. In some implementations, a lock is releasable by actuating a lock release and an interconnect plug which is locked to an interconnect socket can be disconnected from the interconnect socket when the lock release is actuated.

In some implementations, interconnect modules of a modular interconnect may comprise an interconnect socket and an interconnect plug, an input unit may comprise an interconnect socket, and an output unit may comprise an interconnect plug, wherein each interconnect plug may be connected to an interconnect socket and thereby complete an electrical circuit between an electrical plug of an input unit and an electrical receptacle of an output unit. In some implementations, an electrical apparatus comprises interconnect plugs comprising pins and interconnect sockets comprising pin sockets housed within electrically insulating material and accessible only by objects comprising small geometries, such as geometries identifiable as "pin shaped", wherein the interconnect sockets comprise a shroud for receiving an interconnect plug, and pins thereof may not be concurrently electrically energized by contact with a pin socket of an interconnect socket and be exposed outside of an interconnect plug covered shroud of the interconnect socket, such that a safe management of electrical power distribution may be maintained.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of the disclosed subject matter.

FIG. 9A is a perspective view of an implementation of an interconnect module which may comprise a flexible cable.

FIG. 9B is a perspective view of the interconnect module of FIG. 9A wherein an interconnect socket outer housing and an interconnect plug outer housing may be removed.

FIG. 9C is a perspective view of a mounting plate configured to receive an interconnect socket of a first interconnection module mated with an interconnect plug of a second interconnection module.

FIG. 9D is a perspective view of two interconnected flexible interconnect modules comprising a modular interconnection of an interconnect plug of one interconnect module and an interconnect socket of the other interconnect module.

DETAILED DESCRIPTION

Various detailed example implementations of a user configurable electric power distribution apparatus are disclosed herein; however, it is to be understood that the disclosed implementations are merely illustrative and may be embodied in various forms. In addition, each of the examples given in connection with the various implementations is intended to be illustrative, and not restrictive.

The following detailed example implementations refer to the accompanying drawings. The same reference number may appear in multiple drawings and when appearing in multiple drawings will identify the same or similar elements.

Figure 1A:
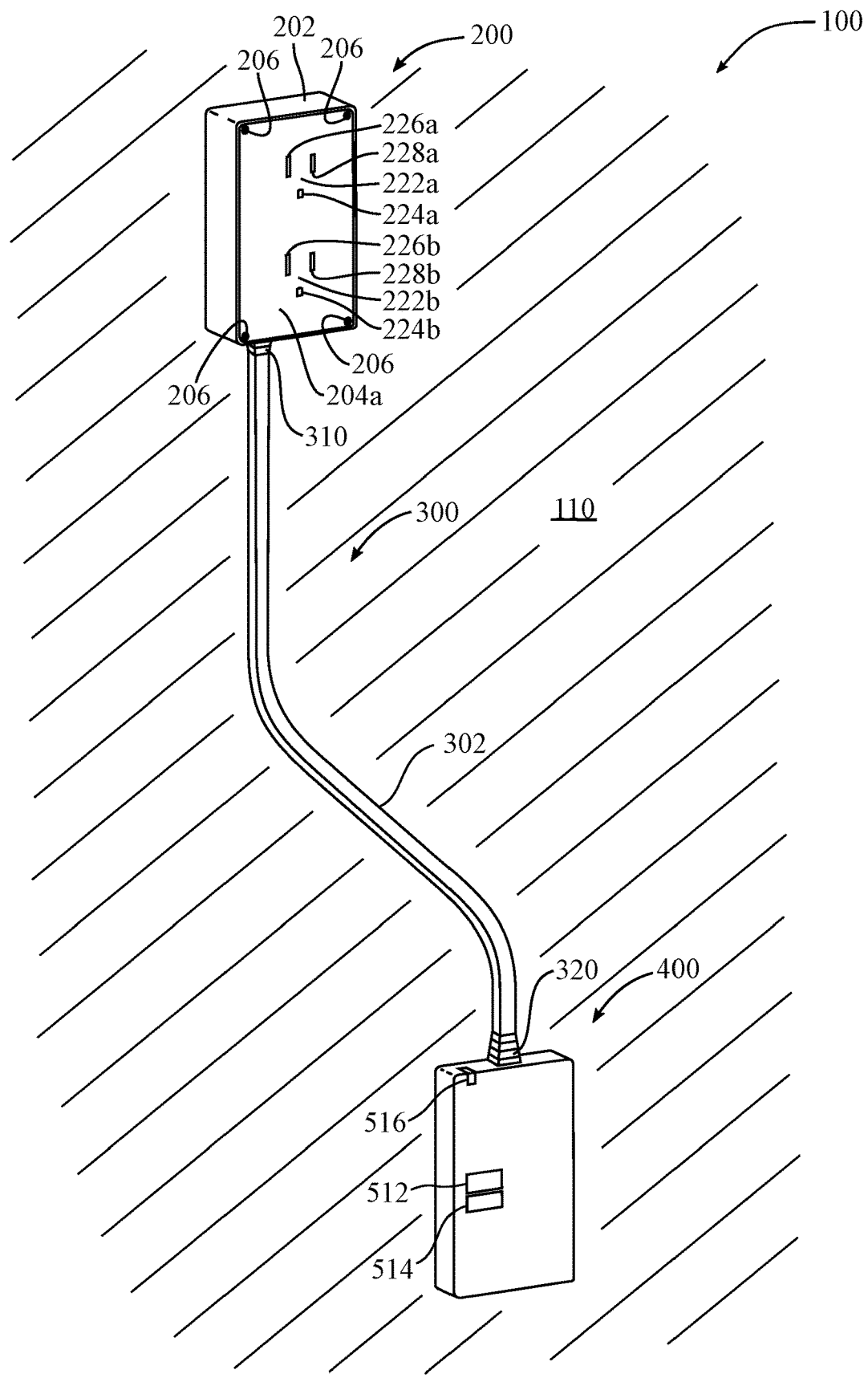
FIG. 1A is a perspective view of an example implementation of an electrical apparatus located on a surface, such as a wall surface.

FIG. 1A depicts a perspective view of an example implementation of a user configurable electric power distribution apparatus (electrical apparatus) 100. Electrical apparatus 100 may comprise an electrical output unit (output unit) 200, an electrical input unit (input unit) 400 and an electrical interconnect 300 which may electrically interconnect output unit 200 with input unit 400. In the example implementation of FIG. 1A, output unit 200 may be located on a surface 110, such as a wall surface, and may comprise an output unit housing 202 and a front assembly 204a which may be secured to output housing 202 with one or more fasteners, such as with screws 206. Front assembly 204a may comprise two electrical receptacles, e.g., an upper electrical receptacle 222a and a lower electrical receptacle 222b. Upper electrical receptacle 222a may comprise an upper ground socket 224a, an upper neutral socket 226a and an upper hot socket 228a. Lower electrical receptacle 222b may comprise a lower ground socket 224b, a lower neutral socket 226b and a lower hot socket 228b. An implementation of an electrical apparatus may have other numbers of electrical receptacles, such as for example, one, three, four, or more electrical receptacles.

Input unit 400 may be attached to an existing electrical outlet (not visible in FIG. 1A) located on surface 110 such that electrical power may be supplied to input unit 400 and be distributed by electrical interconnect 300 to electrical receptacles 222a and 222b of output unit 200. In some implementations, an electrical circuit of electrical apparatus 100 may comprise a ground fault circuit interrupter (GFCI). A GFCI may be configured to interrupt availability of electrical power at electrical receptacles 222a and 222b of output unit 200 upon an occurrence of a ground fault condition resulting in or affecting an electrical current flowing into input unit 400. In some implementations, a ground fault circuit interrupter (GFCI) may be comprised by output unit 200. In some implementations, a GFCI may be comprised by input unit 400, wherein the GFCI may interrupt an electrical path between electrical power supplied to electrical apparatus 100 via input unit 400 and a grounded object receiving electrical current therefrom, wherein at least a portion of current flows to ground, thereby creating an imbalance of current flow into input unit 400 and current flow returning from input unit 400. In some implementations, an input unit 400 comprising a GFCI may further comprise: a GFCI test button 514, wherein depressing test button 514 may generate a ground fault condition and may enable a user to test the GFCI; an indicator 516, such as an LED indicator, which may indicate an occurrence of a ground fault and an interrupted state of the GFCI (or a lack thereof); and a GFCI reset button 512, wherein a user may attempt to reset an interrupted state of the GFCI such that power may potentially be restored to electrical receptacles 222a and 222b of output unit 200.

Electrical interconnect 300 may comprise: a cable/raceway 302, which comprises electrical conductors that may distribute electrical power via a hot and neutral conductor and an electrical ground between input unit 400 and receptacles 222a and 222b of output unit 200; an output unit strain relief 310, which strain relieves cable raceway 302 to output unit 200; and an input unit strain relief 320, which strain relieves cable/raceway 302 to input unit 400. Cable/raceway 302 may be flexible and allow a flexible orientation and positioning of output unit 200 relative to input unit 400. Cable/raceway 302 may be manufactured to meet a safety standard, such as an Underwriters Laboratories (UL) standard, and be of a service grade classification, such as an SJT classification, and may be a flame retardant rated construction, such as an FT2 rated construction. Cable raceway 302 may comprise a durable outer jacket, such as a polyvinyl chloride jacket, which encases a ground conductor, a neutral conductor and a hot conductor, wherein the ground, neutral and hot conductors may be additionally individually jacketed with an electrically insulating jacket, such as a polyvinyl chloride jacket. The conductors may comprise a stranded copper wire and may be a suitable gauge for relocating an outlet tap on a typical 15 amp or 20 amp branch circuit, such as a 14 AWG or 12 AWG.

Figure 1B:
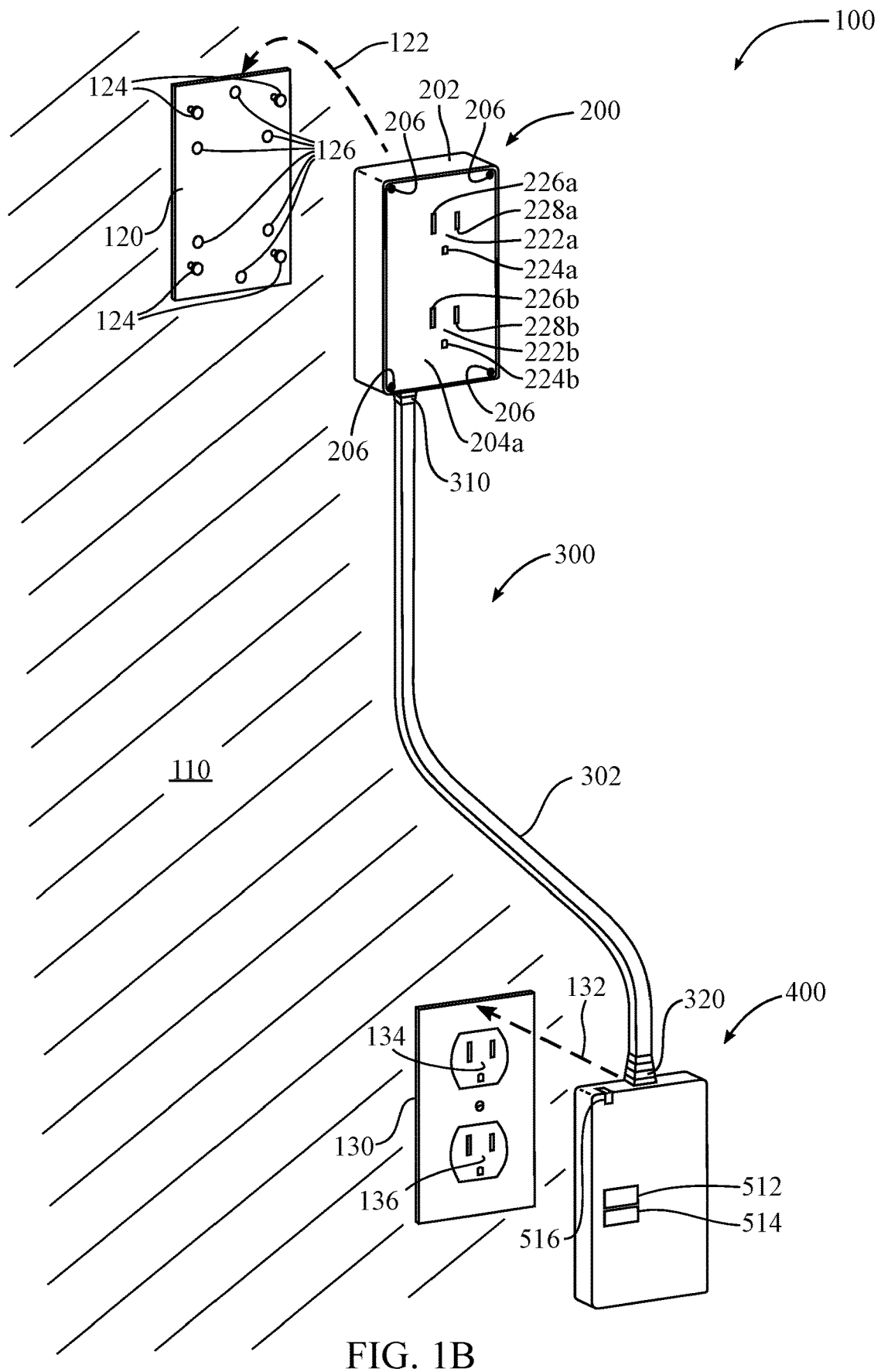
FIG. 1B depicts the example implementation of FIG. 1A, wherein the electrical apparatus is separated from the surface to provide a view of an electrical outlet and a mounting plate.

FIG. 1B depicts the example implementation of FIG. 1A, wherein electrical apparatus 100 is separated from surface 110 such that an existing electrical outlet (existing outlet) 130 and a mounting plate 120 located on surface 110 may be visible in FIG. 1B. In an example implementation of FIG. 1B, a mounting plate 120 may be mounted to surface 110 via one or more attachment holes, such as attachment holes 126, using fasteners suitable for the underlying construction of surface 110, such as by using drywall anchors, toggle bolts, butterfly bolts, molly anchors, woodscrews, concrete anchors, and the like. Alternatively or additionally, and depending on a suitable surface, two-sided adhesive strips, such as a 3M Command™ Strips marketed by 3M Corporation, may be placed between mounting plate 120 and surface 110 to secure or further secure mounting plate 120 to surface 110. Output unit 200 may be removably attached to mounting plate 120 and may be secured via mounting plate studs 124. In an implementation, arrow 122 may indicate a possible mounting motion of an output unit 200 relative to a mounting plate 120. In an implementation not depicted in FIG. 1B, two-sided adhesive strips may be applied directly between a surface and output unit 200 for attachment of output unit 200 to surface 110, however, such an implementation would not be conducive to convenient detachment and reattachment of output unit 200 to surface 110. In an implementation not depicted in FIG. 1B, one or mounting flanges may be comprised by output unit 200 and provide mounting holes for use in conjunction with fasteners suitable for the underlying construction of surface 110. Input unit 400 may be removably attached to existing outlet 130 with a motion which may be indicated by arrow 132. Existing outlet 130 may comprise an existing outlet upper receptacle 134 and an existing outlet lower receptacle 136. Mounting plate 120 may be located in one of a plurality of locations such that when input unit 400 is attached to existing outlet 130 and output unit 200 is attached to mounting plate 120 the distance between, and the positional orientations of input unit 400 and output unit 200, satisfy a physical constraint of electrical interconnect 300.

Figure 1C:
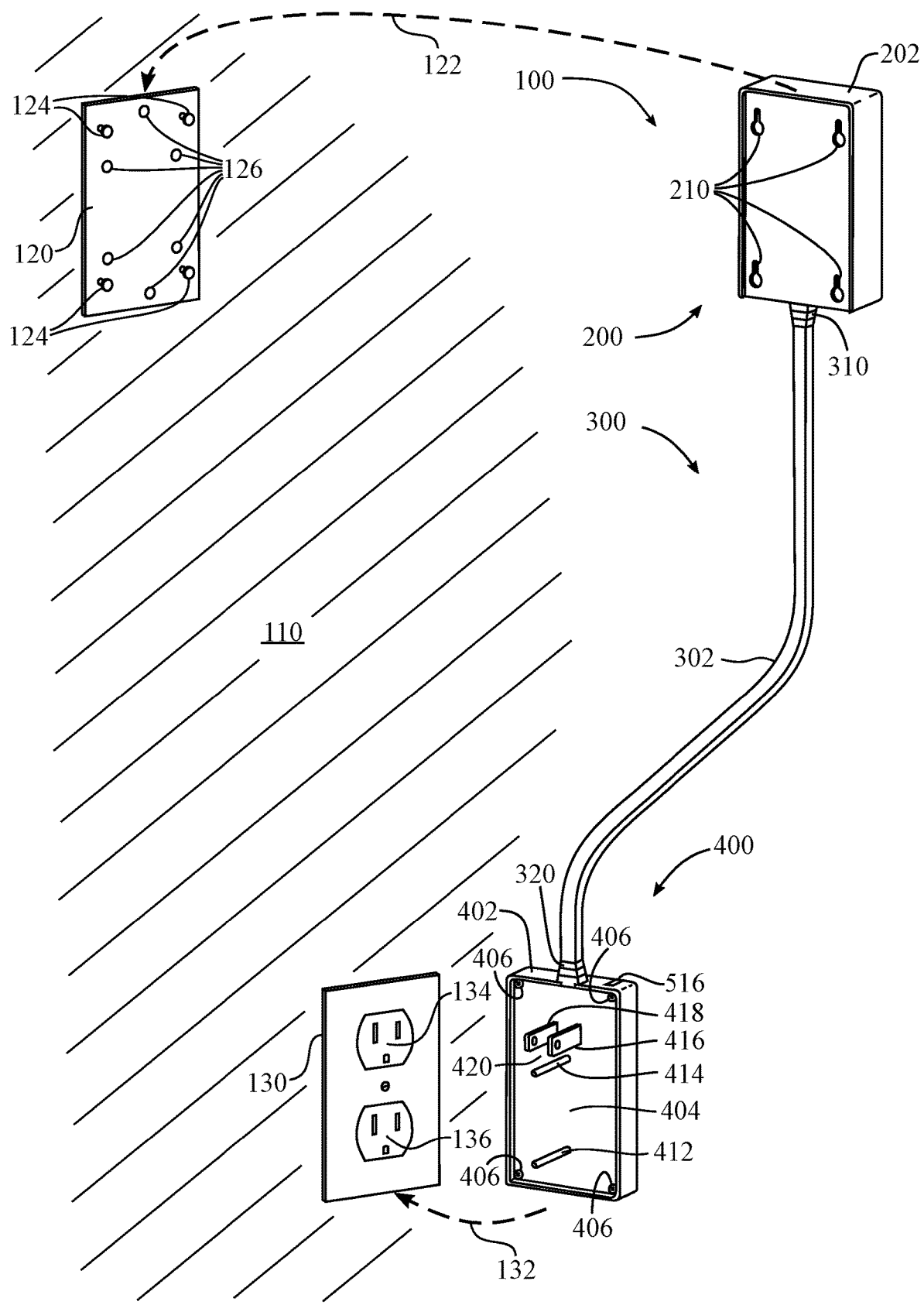
FIG. 1C depicts the example implementation of FIG. 1B, wherein the electrical apparatus is rotated to provide a rear view of the apparatus.

FIG. 1C depicts the example implementation of FIG. 1B, wherein electrical apparatus 100 is rotated such that a back of output unit 200 (mounting plate 120 facing side) and a back of input unit 400 (existing outlet 130 facing side) are visible. Input unit 400 may comprise an input electrical plug (electrical plug) 420 which may plug into upper receptacle 134 of existing outlet 130. Electrical plug 420 may comprise a ground prong 414, a neutral prong 416 and a hot prong 418. In some implementations, input unit 400 may comprise a redundant ground prong 412 which may plug into the ground socket of existing outlet lower receptacle 136. When electrical plug 420 is plugged into existing outlet 130, input unit 400 may serve to cover and conceal existing outlet 130. In some implementations, input unit 400 may not comprise redundant ground prong 412. In some implementations, input unit 400 may comprise a non-electrically operative neutral prong and hot prong (not shown in FIG. 1C), e.g., prongs consisting of hard plastic, or if metal, not electrically connected to electrical interconnect 300, which plug into existing outlet lower receptacle 136 and provide mechanical retention and/or mechanical support for input unit 400. In some implementations, input unit 400 may comprise a fastener (not shown), such as a captive fastener retained by input unit 400 but externally accessible from the front of input unit 400 for rotation, or a fastener inserted into the front and though input unit 400 and accessible for rotation, to screw into threads of an existing outlet, such as outlet plate screw threads of existing outlet 130, wherein such a fastener may secure input unit 400 to existing outlet 130. In some implementations, the fastener may comprise a head that may be actuated by a screwdriver or other such tool. In some implementations, the fastener may comprise a head with a hand operable fastener head, such as a head comprising wings as commonly used in wing nuts, or a foldup tab, swivel-attached to the hand operable head, or the like, wherein tools are not required to secure or remove input unit 400 from screw threads of existing outlet 130. Input unit 400 may further comprise a back plate 404 and one or more back plate fasteners, such as back plate screws 406, wherein back plate screws 406 may secure back plate 404 to an input unit housing 402. The back of output unit 200 comprises output unit mounting holes (mounting holes) 210 which may accept a head of a mounting plate stud 124 and slide down over the stud shaft and capture the head behind a slot, thereby removably attaching output unit 200 to mounting plate 120. In the example implementation of FIG. 1C four such mounting plate studs 124 and four such output unit mounting holes 210 are depicted. In other implementations other numbers of mounting plate studs 124 and mounting holes 210 are possible, such as for example, two or three mounting plate studs 124 and/or mounting holes 210. In an implementation not depicted in FIG. 1C, a mounting plate 120 may not be used, and studs, or raised screws (not fully seated screws) may be secured to surface 110, wherein mounting holes 210 and input unit 200 would be removably attached thereto. In such an implementation, output unit could be detached/removed and reattached without the need for tools.

Figure 2A:
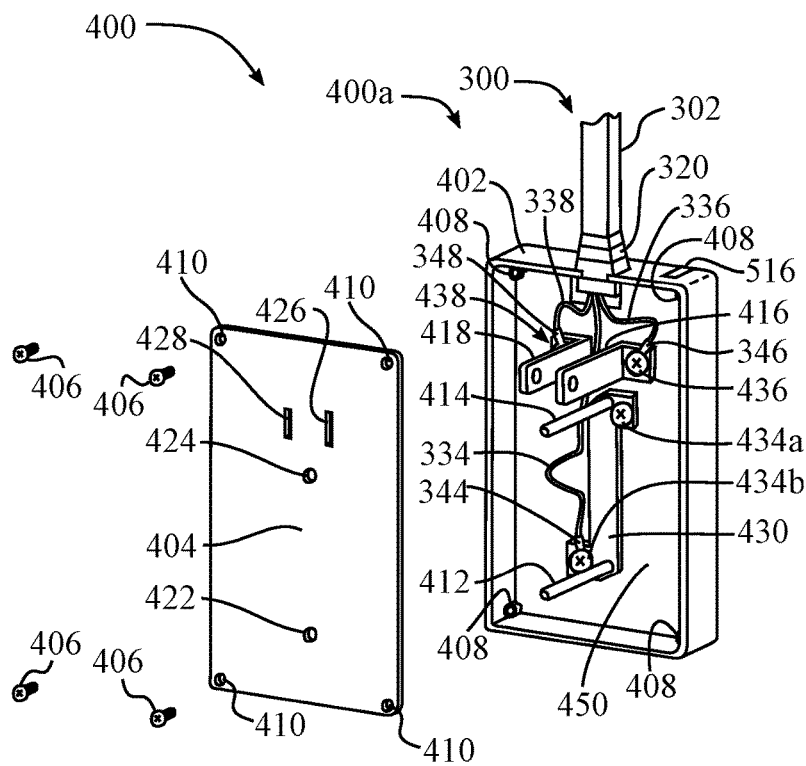
FIG. 2A is a perspective rear view of an example implementation of an input unit with back plate screws and a back plate removed to provide a view of an assembly of the input unit.

FIG. 2A is a perspective rear view of an example implementation of an input unit 400 with back plate screws 406 and a back plate 404 removed and provides a view of an assembly 400a of input unit 400. Back plate 404 may comprise back plate screw holes 410, a redundant ground prong hole 422 a ground prong hole 424, a neutral prong hole 426 and a hot prong hole 428. Assembly 400a may comprise input unit housing 402 which may comprise assembled therein: a ground prong strap 430, comprising redundant ground prong 412 and ground prong 414, wherein ground prong strap 430 may be secured by fasteners, such as two ground screws 434a and 434b, wherein one ground screw 434b may secure an input ground ring connector 334 to ground prong strap 430 and input ground ring connector 344 may be mechanically and electrically secured to a ground conductor 334, for example crimped onto ground conductor 334; neutral prong 416, wherein neutral prong 416 may be secured by a fastener, such as a neutral screw 436, wherein neutral screw 436 may secure an input neutral ring connector 346 to neutral prong 416 and input neutral ring connector 346 may be mechanically and electrically secured to a neutral conductor 336, for example crimped onto neutral conductor 336; and hot prong 418, wherein hot prong 418 may be secured by a fastener, such as a hot screw 438, wherein hot screw 438 may secure an input hot ring connector 348 to hot prong 418 and input hot ring connector 348 may be electrically secured to a hot conductor 338, for example crimped onto hot conductor 338. A circuit board 450 may also be installed within input housing 402 and may be secured by ground screws 434a and 434b, neutral screw 436 and/or hot screw 438 which may also secure ground prong strap 430, neutral prong 416 and hot prong 418. Housing 402 may comprise back plate mounting bosses 408 which may accept back plate mounting screws 406. Back plate 404 may be assembled to housing 402 by passing prongs 412, 414, 416 and 418 though prong holes 422, 424, 426 and 426 and passing back plate screws 406 through back plate screw holes 410 and securing back plate screws 406 to back plate mounting bosses 408.

Figure 2B:
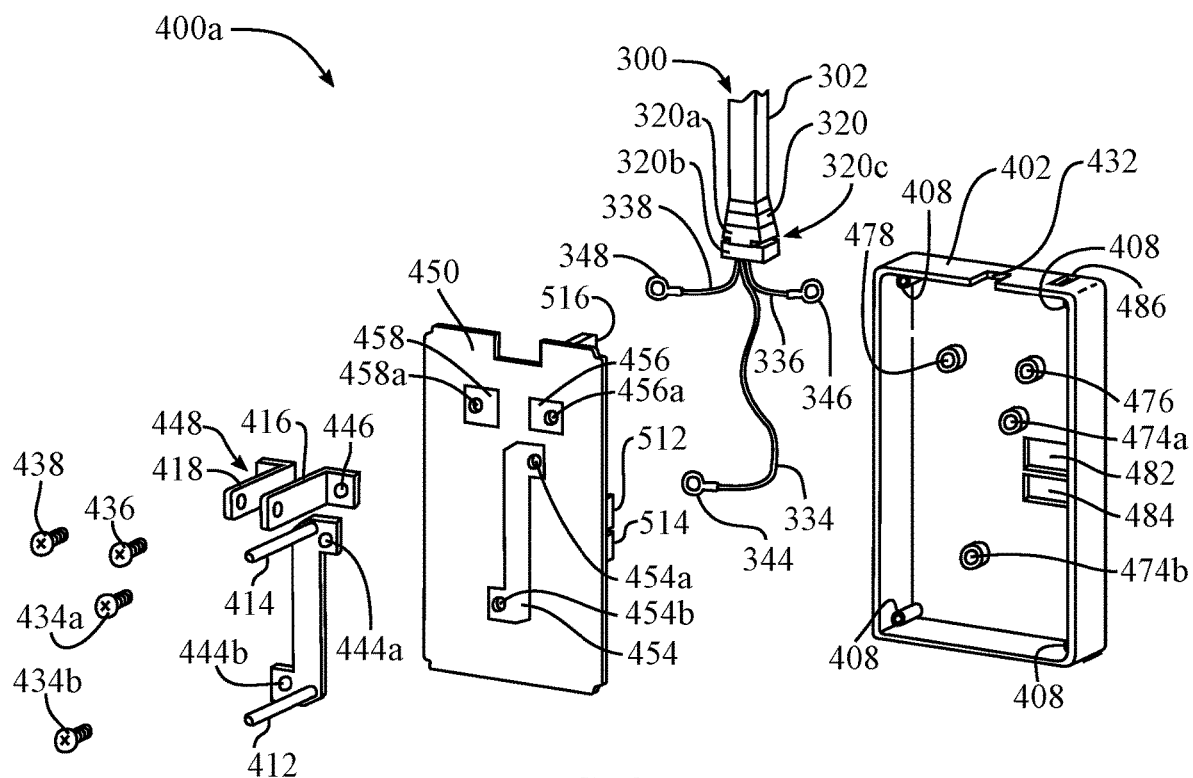
FIG. 2B is an exploded view of the assembly of the input unit of FIG. 2A.

FIG. 2B is an exploded view of assembly 400a of FIG. 2A and may illustrate an example implementation of assembly 400a in a disassembled state, wherein ground screws 434a and 434b, neutral screw 436 and hot screw 438 may be removed; ground ring connector 344 and conductor 334, neutral ring connector 346 and conductor 336 and hot ring conductor 348 and conductor 338 may be removed; ground prong strap 430, neutral prong 416 and hot prong 418 may be removed; and circuit board 450 may be removed. Input unit housing 402 may comprise mounting bosses to receive screws 434a, 434b, 436 and 448, namely, ground strap mounting bosses 474a and 474b, a neutral prong mounting boss 476 and a hot prong mounting boss 478. Circuit board 450 may comprise a ground strap pad 454, neutral prong pad 456 and hot prong pad 458 on which ground bar 430, neutral prong 416 and hot prong 414 may be mounted, respectively, such that electrical connection may be made therebetween and electrical power and electrical ground may be received by circuit board 450 from a connected existing outlet 130 via pads 454, 456 and 458. Circuit board 450 may comprise ground strap circuit board holes 454a and 454b, a neutral prong circuit board hole 456a and a hot prong circuit board hole 458a to allow screws 434a, 434b, 436 and 438 to pass through circuit board 450. In some implementations, circuit board 450 may comprise a GFCI and other circuitry such as an indicator circuit and an indicator, such as one or more LED indicators 516, which may indicate a status, including a status of electrical power available at prongs 416 and 418, and a status of a GFCI switch, such as an open switch resulting from an occurrence of a ground fault, a GFCI test circuit and a test button 514 and a GFCI reset circuit and a reset button 512. In such an implementation, input unit housing 402 may comprise a GFCI reset button opening 482, a GFCI test button opening 484 and an indicator opening 486. A GFCI circuit may be implemented similar to an implementation disclosed in an FAN4147 Datasheet, dated March, 2013, wherein a FAN4147 is a ground fault interrupter controller marketed by Fairchild Semiconductor and the aforementioned datasheet discloses a typical application of the FAN4147 controller.

To assemble assembly 400a, circuit board 450 may be inserted into input housing 402 on top of bosses 474a, 474b, 476 and 478; ground prong strap 430 comprising ground prongs 412 and 414, neutral prong 416 and hot prong 418 may be installed on pads 454, 456 and 458 of circuit board 450; input ground ring connector 334, input neutral ring connector 436 and input hot ring connector 438 may be placed on ground prong strap 930, neutral prong 916 and hot prong 918. Screws may then be used to secure assembly 400a as follows: ground screw 434a may pass through input ground ring connector 334, through a ground strap mounting hole 444a, through ground strap circuit board mounting hole 454a and into ground strap mounting boss 474a; ground screw 434b may pass through input ground ring connector 344, though a ground strap mounting hole 444b, through ground strap circuit board mounting hole 454b and into ground strap mounting boss 474b; neutral screw 436 may pass through input neutral ring connector 346, through a neutral prong mounting hole 446, through neutral prong circuit board mounting hole 456a and into neutral prong mounting boss 476; and hot screw 438 may pass through input hot ring connector 348, through a hot prong mounting hole 448, through hot prong circuit board mounting hole 458a and into hot prong mounting boss 478.

Input unit strain relief 320 may comprise an inner strain relief portion 320b and an outer strain relief portion 320a configured to provide a strain relief retention groove 320c which may mate with a strain relief slot 432 comprised by input unit housing 402 and secure electrical interconnect 300 to input unit housing 402 via input unit strain relief 320. Edges of input unit housing 402 formed by strain relief slot 432 may pass into strain relief retention groove 320c when input unit strain relief 320 is inserted therein, thereby capturing and securing input unit strain relief 320, and in turn securing electrical interconnect 300 to input unit housing 402. Input unit strain relief 320 may be manufactured using a plurality of methods. One method may be an overmolding process, wherein a thermoplastic resin is injection molded over cable/raceway 302 of electrical interconnect 300. An Underwriters Laboratories (UL) recognized flame retardant material, such as a UL 94V-0 (burning stops within 10 seconds on a vertical specimen; drips of particles allowed as long as they are not inflamed) rated material may be used as an overmold thermoplastic resin. Cable/raceway 302 of electrical interconnect 300 may comprise ground conductor 334, neutral conductor 336 and hot conductor 338, and as noted earlier, may be manufactured to meet a safety standard, such as an Underwriters Laboratories (UL) standard, and be of a service grade classification, such as an SJT classification, and may be a flame retardant rated construction, such as an FT2 rated construction. Cable raceway 302 may comprise a durable outer jacket, such as a polyvinyl chloride jacket, which encases ground conductor 334, neutral conductor 346 and hot conductor 348, wherein conductors 344, 346 and 348 may be additionally individually jacketed with an electrically insulating jacket, such as a polyvinyl chloride jacket. The conductors may comprise a stranded copper wire and may be a suitable gauge for relocating an outlet tap on a typical 15 amp or 20 amp branch circuit, such as a 14 AWG or 12 AWG.

Implementations of an input unit 400 as described are illustrative and many implementations are possible. Various materials and constructions are possible. Components such as housing 402 and plate 404 which may restrict access to electrical power, such as to restrict unintentional contact with an electrified component, may be constructed of an electrically insulating, durable and rigid material, such as for example, an electrically insulating plastic resin, and may be manufactured, for example, using a thermoforming process such as an injection molding process, and may be manufactured of an Underwriters Laboratories (UL) recognized flame retardant material, such as a UL 94V-0 (burning stops within 10 seconds on a vertical specimen; drips of particles allowed as long as they are not inflamed) rated material. Other components which are configured to conduct electrical power, such as prongs 412, 414, 416 and 418, may be constructed of metals, such as brass (which is a harder metal than copper and may provide for low wear and durability), and be configured to provide a low impedance electrical path and have a capacity to conduct 15 amperes of electrical current when connected to an existing outlet of a branch circuit.

Figure 3A:
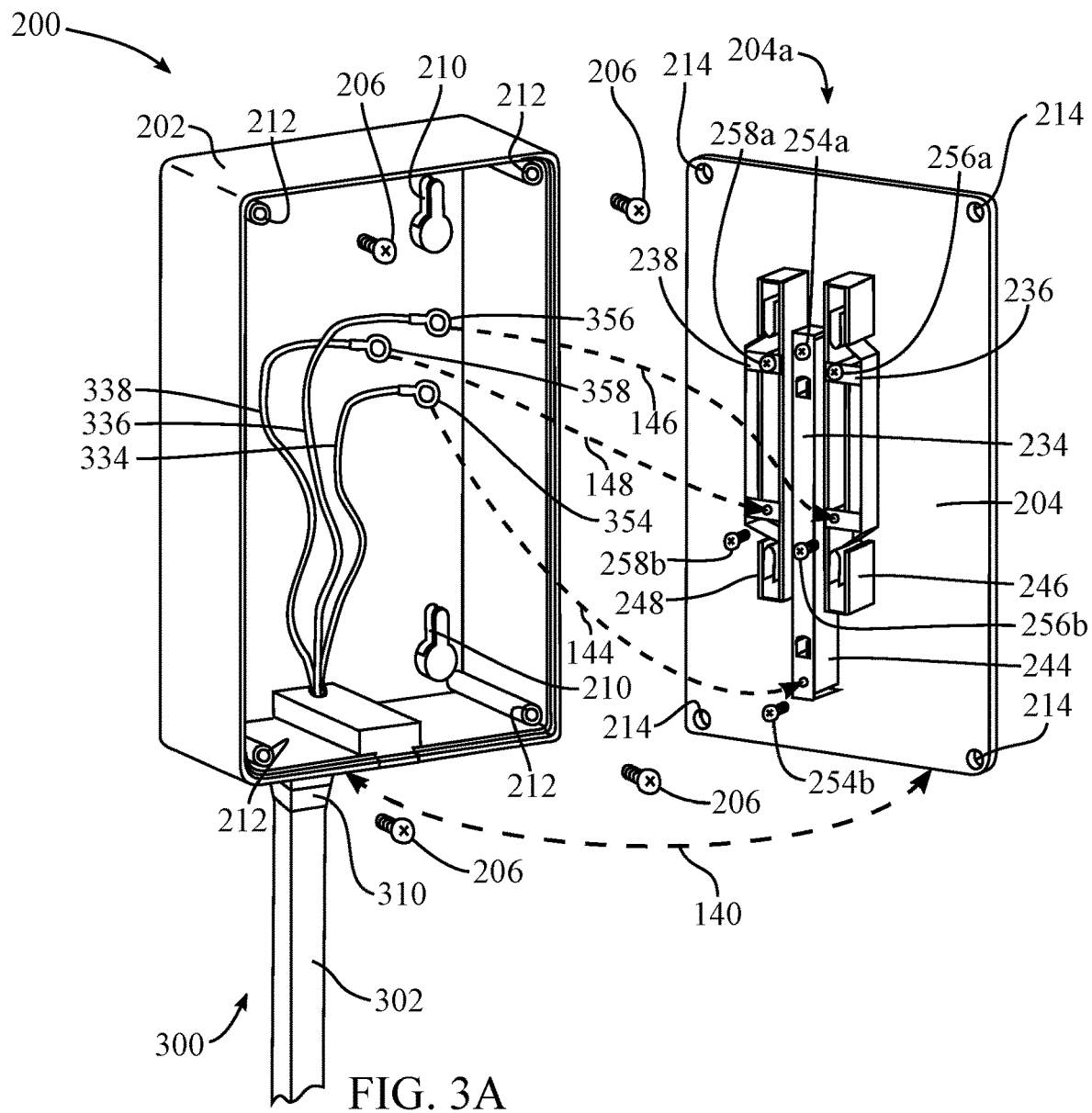
FIG. 3A is a perspective view of an example implementation of an output unit, wherein front assembly screws are removed and a front assembly is rotated to provide a rear view of the front assembly.

FIG. 3A is a perspective view of an example implementation of an output unit 200, wherein front assembly screws 206 may be removed and a front assembly 204a may be removed in a motion that may be indicated by an arrow 140 and be rotated to provide a rear view of front assembly 204a. Front assembly 204a may comprise: a front plate 204, a ground busbar 234 secured to a ground busbar housing 244, wherein the ground busbar 234 may be secured using one or more fasteners, such as a ground busbar upper mounting screw 254a and a ground busbar lower mounting screw 254b; a neutral busbar 236 secured to a neutral busbar housing 246, wherein the neutral busbar 236 may be secured using one or more fasteners, such as a neutral busbar upper mounting screw 256a and a neutral busbar lower mounting screw 256b; and a hot busbar 238 secured to a hot busbar housing 248, wherein the hot busbar 238 may be secured using one or more fasteners, such as a hot busbar upper mounting screw 258a and a hot busbar lower mounting screw 258b. Fasteners, such as screws 254a, 254b, 256a, 256b, 258a and 258b may also secure an electrical connection to busbars 234, 236 and 238. In the example implementation depicted in FIG. 3A, a ground output ring connector 354 may be mechanically and electrically secured to a ground conductor 334, for example crimped onto ground conductor 334, and may be positioned as indicated by an arrow 144 and mechanically and electrically secured to ground busbar 234 with ground busbar lower mounting screw 265b; a neutral output ring connector 356 may be mechanically and electrically secured to a neutral conductor 336, for example crimped onto neutral conductor 336, and may be positioned as indicated by an arrow 146 and mechanically and electrically secured to neutral busbar 236 with neutral busbar lower mounting screw 256b; and a hot output ring connector 358 may be electrically secured to a hot conductor 338, for example crimped onto hot conductor 338, and may be positioned as indicated by an arrow 148 and mechanically and electrically secured to hot busbar 238 with hot busbar lower mounting screw 258b. Output unit housing 202 may comprise front assembly mounting bosses 212 and front assembly may comprise front assembly mounting holes 214, wherein front assembly 204a may be located to position front assembly mounting holes 214 on front assembly mounting bosses 212 and secured thereto with front assembly screws 206. In the example implementation depicted in FIG. 3A, two of four output unit mounting holes 210 depicted in FIG. 1C are visible. Output unit mounting holes 210 may comprise an interior wall such that an object may not be easily inserted into output unit 200 and potentially make contact with an electrified component therein.

Figure 3B:
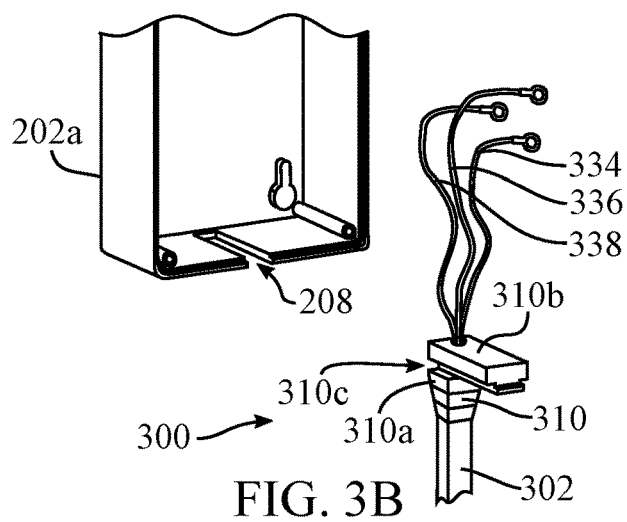
FIG. 3B is a perspective view of a lower portion of an output unit housing of the example implementation of FIG. 3A, wherein an output unit strain relief and electrical interconnect are removed.

FIG. 3B is a perspective view of a lower portion of output unit housing 202a, wherein output unit strain relief 310 and electrical interconnect 300 are removed from output unit housing 210a. Output unit housing 202a comprises an output unit strain relief slot 208. Output unit strain relief 310 may comprise an inner strain relief portion 310b and an outer strain relief portion 310a configured to provide a strain relief retention groove 310c which may mate with strain relief slot 208 and secure electrical interconnect 300 to output unit housing 202a (and output housing 202 as shown in FIG. 3A) via output unit strain relief 310. Edges of output unit housing 202 formed by strain relief slot 208 may pass into strain relief retention groove 310c when output unit strain relief 310 is inserted therein, thereby capturing and securing output unit strain relief 310, and in turn securing electrical interconnect 300, to output unit housing 202. Output unit strain relief 310 may be manufactured using a plurality of methods. One method may be an overmolding process as described earlier herein in conjunction with input unit strain relief 320. Cable/raceway 302 of electrical interconnect 300 may comprise ground conductor 334, neutral conductor 336 and hot conductor 338, and may be manufactured to meet a safety standard, as noted earlier herein. Conductors 334, 336 and 338 may electrically interconnect output ring connectors 354, 356 and 358 (FIG. 3A) to input ring connectors 344, 346 and 348 (FIG. 2B) via cable/raceway 302 of electrical interconnect 300.

Figure 3C:
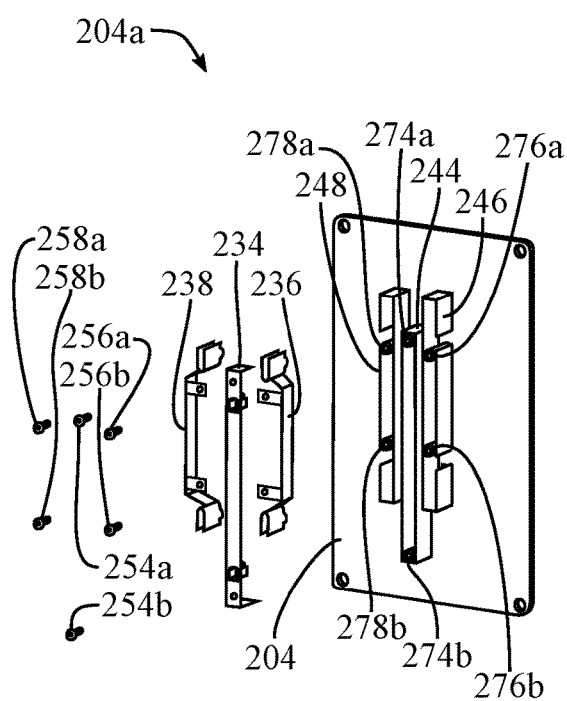
FIG. 3C is an exploded rear view of the front assembly of the example implementation of FIG. 3A.

FIG. 3C is an exploded rear view of front assembly 204a of the example implementation of FIG. 3A. Front assembly 204a may comprise a ground busbar upper mounting boss 274a, a ground busbar lower mounting boss 274b, a neutral busbar upper mounting boss 276a, a neutral busbar lower mounting boss 276b, a hot busbar upper mounting boss 278a and a hot busbar lower mounting boss 278b, wherein ground busbar mounting screws 254a and 254b, neutral busbar mounting screws 256a and 256b and hot busbar mounting screws 258a and 258b may be removed therefrom, and ground busbar 234, neutral busbar 236 and hot busbar 238 may be removed as depicted in FIG. 3C.

Implementations of an output unit 200 as described are illustrative and many implementations are possible. Various materials and constructions are possible. Components such as housing 202 and front plate 204 which may restrict access to electrical power, such as to restrict unintentional contact with an electrified component, may be constructed of an electrically insulating, durable and rigid material, such as for example, an electrically insulating plastic resin, and may be manufactured, for example, using a thermoforming process such as an injection molding process, and may be manufactured of an Underwriters Laboratories (UL) recognized flame retardant material, such as a UL 94V-0 (burning stops within 10 seconds on a vertical specimen; drips of particles allowed as long as they are not inflamed) rated material. Other components which are configured to conduct electrical power, such as busbars 234, 236 and 238, may be constructed of metals, such as brass (which is a harder metal than copper and may provide for low wear and durability), and be configured to provide a low impedance electrical path and have a capacity to conduct 15 amperes of electrical current when electrically connected to an existing outlet of a branch circuit.

Figure 3D:
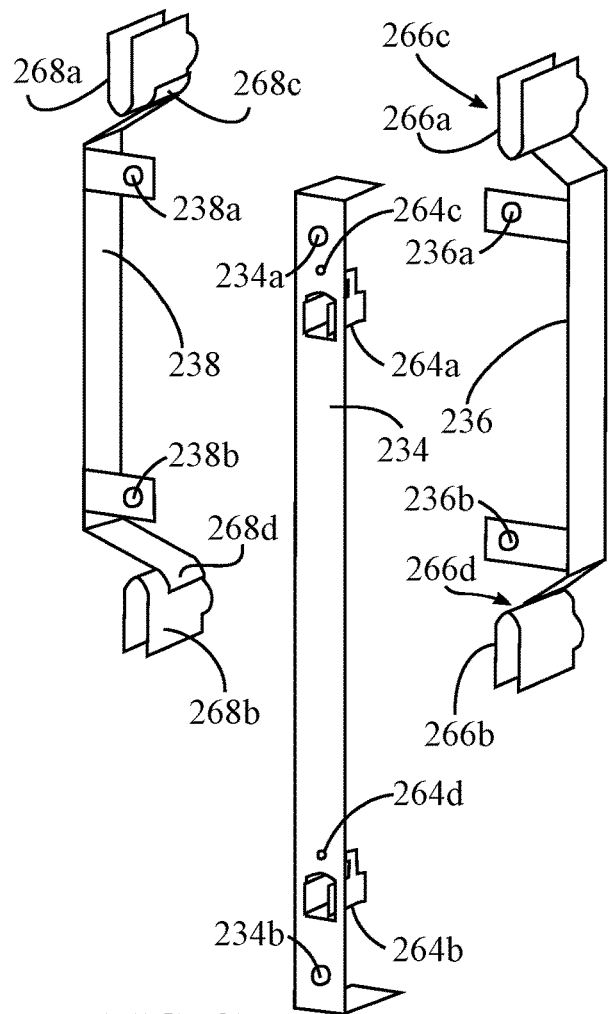
FIG. 3D is a rear perspective view of a ground busbar, neutral busbar and hot busbar.

FIG. 3D is a rear perspective view of ground busbar 234, neutral busbar 236 and hot busbar 238. Ground busbar 234 may comprise an upper ground prong socket 264a, which may be attached at an attachment point 264c, a lower ground prong socket 264b, which may be attached at an attachment point 264d, an upper mounting hole 234a and a lower mounting hole 234b. Neutral busbar 236 may comprise an upper neutral prong socket 266a, which may be attached at an attachment point 266c, a lower neutral prong socket 266b, which may be attached at an attachment point 266d, an upper mounting hole 236a and a lower mounting hole 236b. Hot busbar 238 may comprise an upper hot prong socket 268a, which may be attached at an attachment point 268c, a lower hot prong socket 268b, which may be an attached at attachment point 268d, an upper mounting hole 238a and a lower mounting hole 238b.

Figure 3E:
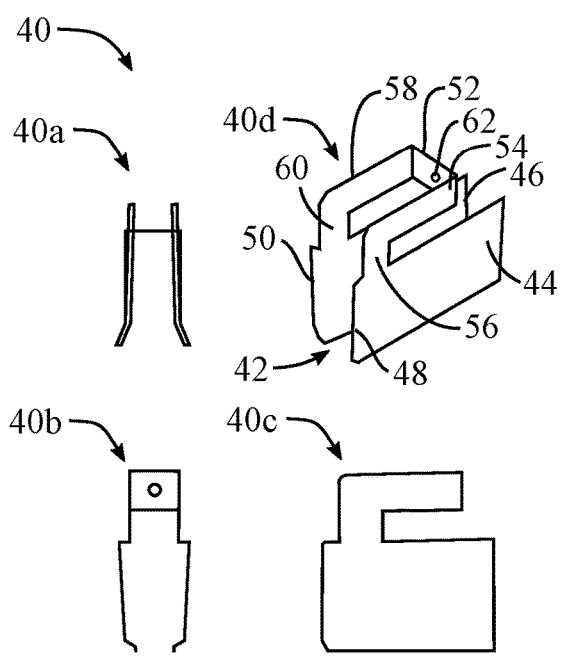
FIG. 3E illustrates an example implementation of a ground prong socket, such as ground prong sockets comprised by the ground busbar of FIG. 3D, wherein the ground prong socket is depicted in four views, namely a top view, a front (prong entry side) view, a right side view and a perspective view.

FIG. 3E illustrates an example implementation of a ground prong socket 40, such as ground prong sockets 264a and 264b of FIG. 3D, depicted in four views: 40a is a top view; 40b is a front (prong entry side) view; 40c is a right side view; and 40d is a perspective view. Ground prong socket 40 may comprise a right side wiper contact 44 and a left side wiper contact 46. Right side wiper contact 44 and left sider wiper contact 46 may each comprise a deflection wing 48 and 50, respectively, which may cause wiper contacts 44 and 46 to resiliently spread in a gap distance between each other in response to an entry of a ground prong at a location 42. Wiper contact 44 may be connected to a mounting bar 52 via a horizontal arm 54 and a vertical arm 56, and wiper contact 46 may be connected to a mounting bar 52 via a horizontal arm 58 and a vertical arm 60, wherein arms 54, 56, 58 and 60 may be flexible and permit wiper contacts 44 and 46 movement to resiliently spread in a gap distance between each other to allow entry of a ground prong therebetween, and maintain a flat and pressured contact along a section of the ground prong therebetween. Mounting bar 52 may comprise an attachment point 62 wherein mounting bar 52 may be attached to a ground busbar, such as ground busbar 234 of FIG. 3D, at attachment point 264c or attachment point 264d. Such attachment may comprise an attachment method, such as for example, a weld, rivet and/or the like, and result in electrical connectivity between wiper contacts 44 and 46 and ground busbar 234.

Figure 3F:
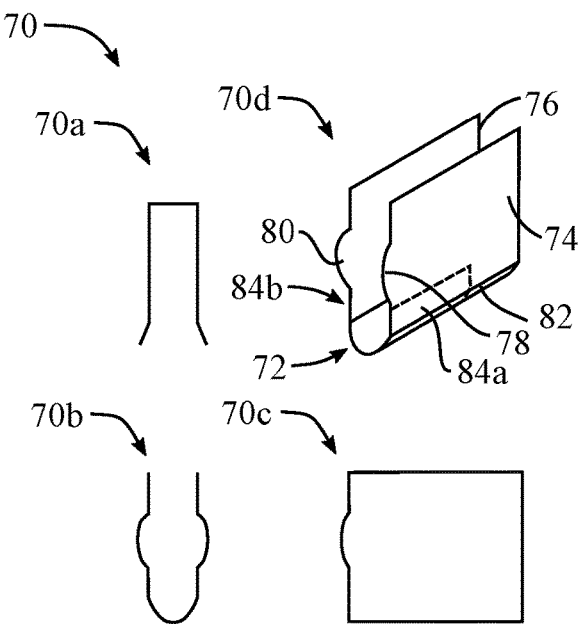
FIG. 3F illustrates an example implementation of a blade prong socket, such as neutral prong sockets and hot prong sockets comprised by the neutral busbar and hot busbar of FIG. 3D, wherein the blade prong socket is depicted in four views, namely a top view, a front (prong entry side) view, a right side view and a perspective view.

FIG. 3F illustrates an example implementation of a blade prong socket 70, which may accept a blade prong such as a neutral prong or a hot prong, and may be similar to neutral prong sockets 266a and 266b and hot prong sockets 268a and 268*b* of FIG. 3D. Blade prong socket 70 is depicted in four views: 70*a* is a top view; 70*b* is a front (prong entry side) view; 70*c* is a right side view; and 70*d* is a perspective view. Blade prong socket 70 may comprise a right side wiper contact 74 and a left side wiper contact 76. Right side wiper contact 74 and left sider wiper contact 76 may each comprise a deflection wing 78 and 80, respectively, which may cause wiper contacts 74 and 76 to resiliently spread in a gap distance between each other in response to an entry of a blade prong at a location 72. Wiper contact 74 may be connected to wiper contact 76 via a base 82. Wiper contacts 74 and 76 and base 82 may be flexible and permit wiper contacts 74 and 76 movement to resiliently spread in a gap distance between each other to allow entry of a blade prong therebetween, and maintain a flat and pressured contact along a section of the blade prong therebetween. Blade prong socket 70 may comprise an attachment point 84*a* or 84*b* wherein blade prong socket 70 may be attached to a neutral busbar or a hot busbar, such as busbar 236 or 238 of FIG. 3D, at attachment point 266*c*, 266*d*, 268*c* or 268*d*. Such attachment may comprise an attachment method, such as for example, a weld, rivet and/or the like, and result in electrical connectivity between wiper contacts 74 and 76 and busbar 236 or 238. Various other implementations of busbars 234, 236 and 238 and contacts 40, 70, 264*a*, 264*b*, 266*a*, 266*b*, 268*a* and 268*b* are possible. For example, other methods of construction, configurations, attachments (or forming to be comprised by a common part) are may be used. Various conductive materials and constructions which provide a low impedance electrical path between a prong connected to a contact and a ring connector connected to a busbar, and having a capacity to conduct 15 amperes electrical power received from a connected branch circuit may be used.

Figure 4A:
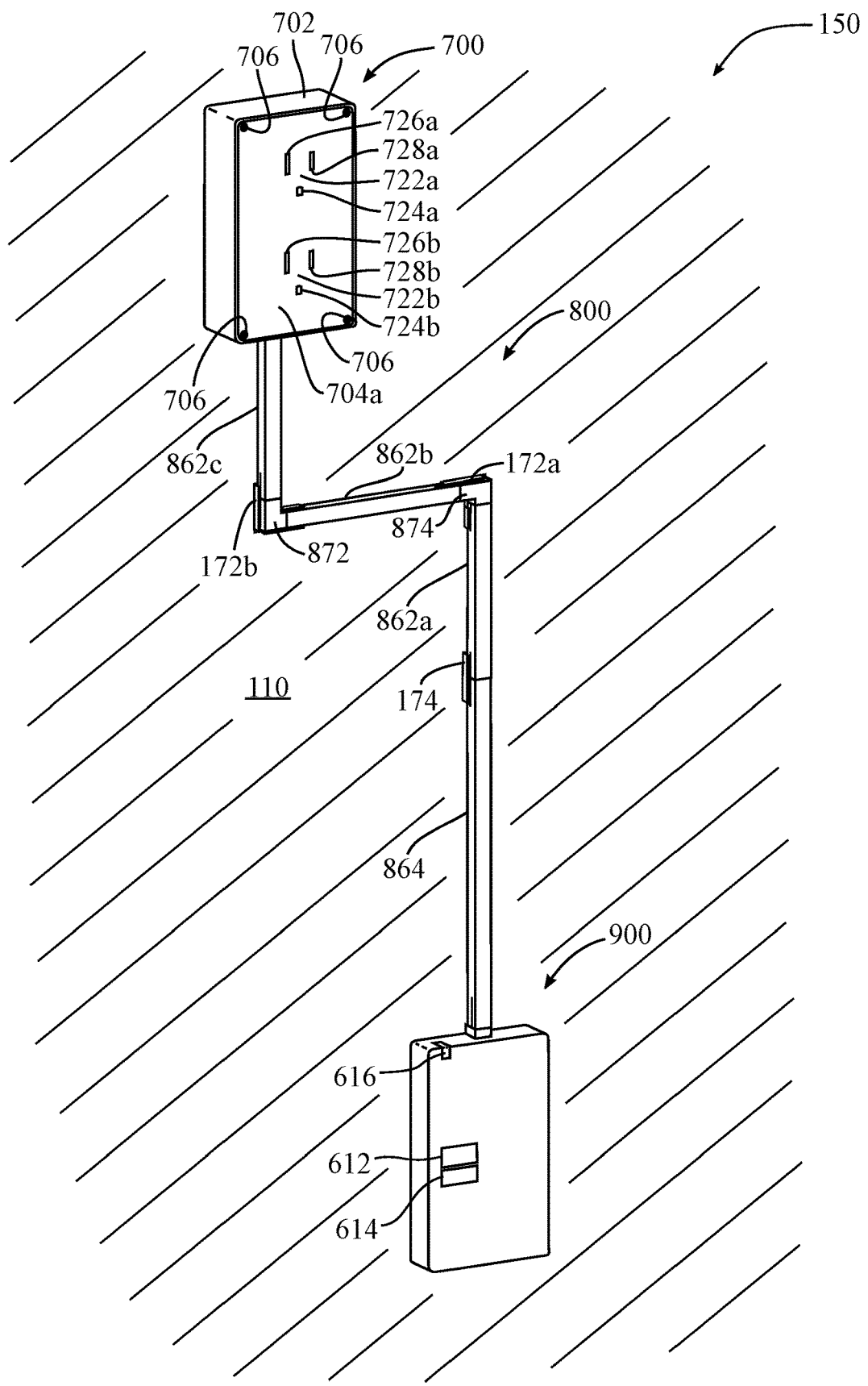
FIG. 4A is a perspective view of an example implementation of a modular electrical apparatus located on a surface, such as a wall surface.

In some implementations, an electric power distribution apparatus may comprise a modular connection system, such that a user may connect various modular components to configure a modular electrical apparatus. FIG. 4A is a perspective view of an example implementation of a user configurable modular electric power distribution apparatus (modular electrical apparatus) 150. Modular electrical apparatus 150 may comprise an electrical output unit (output unit) 700, an electrical input unit (input unit) 900 and a modular electrical interconnect 800 which may electrically interconnect output unit 700 with input unit 900. In the example implementation of FIG. 4A, output unit 700 may be located on a surface 110, such as a wall surface, and may comprise an output unit housing 702 and a front assembly 704*a* which may be secured to output housing 702 with one or more fasteners such as with screws 706. Front assembly 704*a* may comprise two receptacles, e.g., an upper receptacle 722*a* and a lower receptacle 722*b*. Upper receptacle 722*a* may comprise an upper ground socket 724*a*, an upper neutral socket 726*a* and an upper hot socket 728*a*. Lower receptacle 722*b* may comprise a lower ground socket 724*b*, a lower neutral socket 726*b* and a lower hot socket 728*b*. An implementation of a modular electrical apparatus may have other numbers of receptacles, such as for example, one, three, four, or more receptacles.

Input unit 900 may be attached to an existing electrical outlet (not visible in FIG. 4A) located on surface 110 such that electrical power may be supplied to input unit 900 and be distributed by electrical interconnect 800 to receptacles 722*a* and 722*b* of output unit 700. In some implementations, a modular electrical apparatus 150 may comprise a ground fault circuit interrupter (GFCI). A GFCI may be configured to interrupt availability of electrical power at electrical receptacles 722*a* and 722*b* of output unit 700 upon an occurrence of a ground fault condition resulting in or affecting an electrical current flowing into input unit 900. In some implementations, a ground fault circuit interrupter (GFCI) may be comprised by input unit 900, wherein the GFCI may interrupt an electrical path between electrical power supplied to modular electrical apparatus 150 via input unit 900 and a grounded object receiving electrical current therefrom, wherein at least a portion of current flows to ground, thereby creating an imbalance of current flow into input unit 900 and current flow returning from input unit 900. In some implementations, an input unit 900 comprising a GFCI may further comprise: a GFCI test button 614, wherein depressing test button 614 may generate a ground fault condition and may enable a user to test the GFCI; an indicator 616, such as an LED indicator, which may indicate an occurrence of a ground fault and an interrupted state of the GFCI (or a lack thereof); and a GFCI reset button 612, wherein a user may attempt to reset an interrupted state of the GFCI such that power may potentially be restored to electrical receptacles 222*a* and 222*b* of output unit 700.

Modular electrical interconnect 800 may be modular and may comprise straight interconnect modules and angled interconnect modules. In some implementations, straight interconnect modules may be provided in various types, such as: various lengths; various colors; various constructions, including flexible construction and rigid construction; and the like. In some implementations, angled interconnect modules may be provided in various types, such as: various angles, e.g., 90 degree, 45 degree, variable degrees (swivel), and the like; various orientations, such as angle right and angle left, etc.; various colors; various constructions; and the like. In the example implementation of FIG. 4A, electrical interconnect 800 may comprise two types of straight interconnect modules in various quantities, namely, three type A straight interconnect modules, such as, an interconnect module 862*a*, an interconnect module 862*b* and an interconnect module 862*c*, and one type B straight interconnect module 864. A difference between a type A straight interconnect module, such as 862*a*, and a type B straight interconnect module, such as 864, may be a difference in length. In the example implementation of FIG. 4A, interconnect 800 may comprise two types of angled interconnect modules, namely one type A angled interconnect module 872 and one type B interconnect module 874. A difference between a type A angled interconnect module 872 and a type B angled interconnect module 874 may be a difference in orientation of angle. Modular interconnects 862*a*, 862*b*, 862*c*, 864, 872 and 874 may comprise electrical conductors that may interconnect between connected modules and distribute electrical power via a series of interconnected hot conductors and a series of interconnected neutral conductors and provide an electrical ground via a series of interconnected ground conductors between an existing outlet (not visible in FIG. 4A) via input unit 900 and receptacles 722*a* and 722*b* of output unit 700. Partially visible in FIG. 4A are module mounting plates 172*a*, 172*b* and 174, which may be more fully depicted in FIG. 4C and FIG. 4C.

Figure 4B:
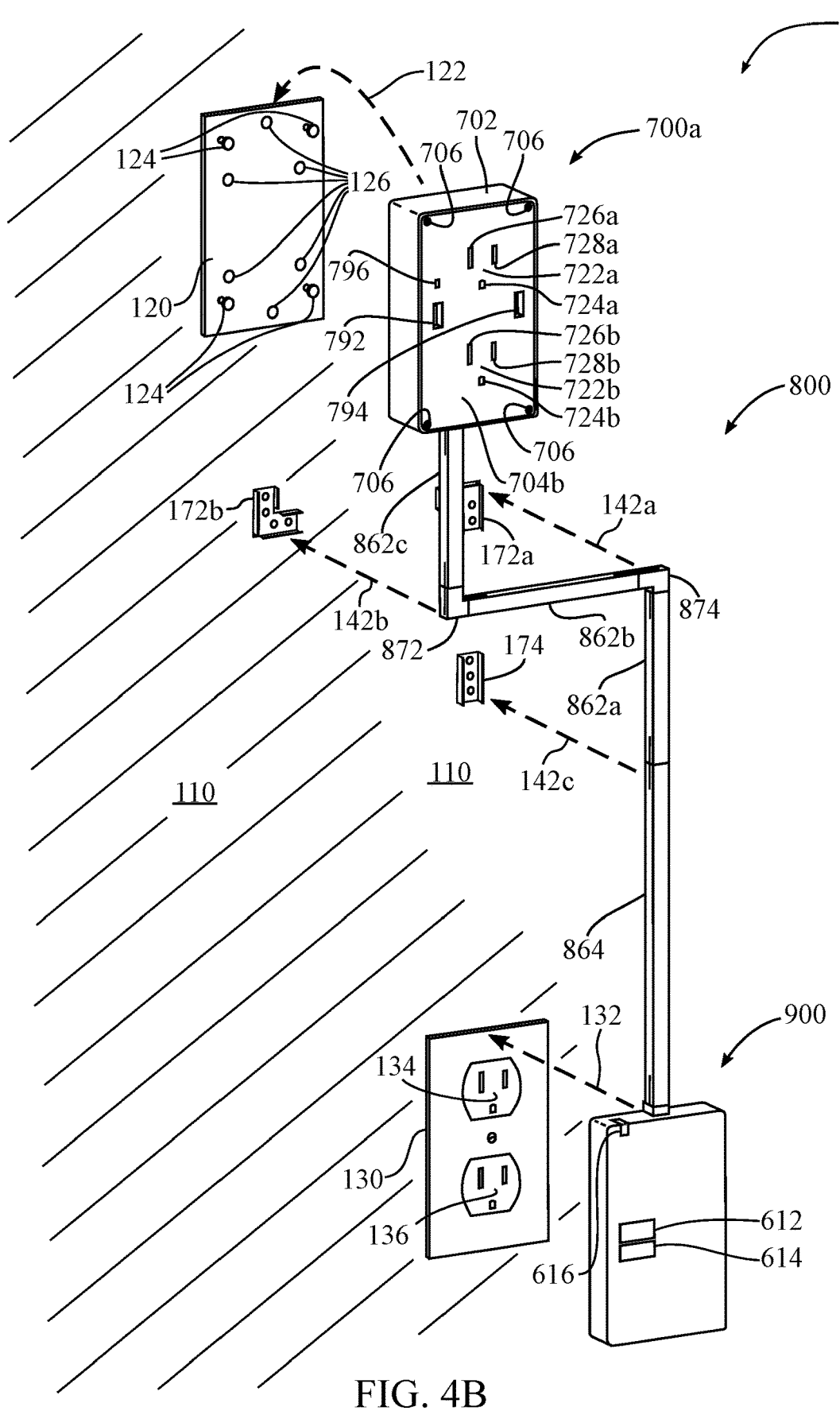
FIG. 4B depicts the example implementation of FIG. 4A, wherein the modular electrical apparatus is separated from the surface to provide a view of an electrical outlet and a mounting plate.

FIG. 4B is a perspective view example implementation of the modular electrical apparatus 150*a* of FIG. 4A separated from surface 110 such that an existing electrical outlet (existing outlet) 130 and a mounting plate 120 located on surface 110 may be visible, and module mounting plates 172*a*, 172*b* and 174 may be visible or at least partially visible. Modular electrical apparatus 150*a* may comprise an implementation of an outlet unit 700*a* which may comprise a front assembly 704*b* which may comprise USB power ports 792 and 794 and may further comprise an indicator 796, such as an LED indicator, which may indicate an electrical power status, such as electrical power is available at receptacles 722a and 722b, and USB power ports 792 and 794. In some implementations, indicator 796 may also provide an indication of a fault condition, such as an occurrence of a ground fault and an interrupted state of the GFCI. Mounting plate 120 may be mounted to surface 110 via one or more attachment holes, such as attachment holes 126, using fasteners suitable for the underlying construction of surface 110, such as by using drywall anchors, toggle bolts, butterfly bolts, molly anchors, woodscrews, concrete anchors, and the like. Alternatively or additionally, two-sided adhesive strips, such as 3M Command Strips™, may be placed between mounting plate 120 and surface 110 to secure or further secure mounting plate 120 to surface 110. Output unit 700a may be removably attached to mounting plate 120 and may be secured via mounting plate studs 124. In an implementation, arrow 122 may indicate a possible mounting motion of an output unit 700a relative to a mounting plate 120. In an implementation not depicted in FIG. 4B, two-sided adhesive strips may be applied directly between a surface and output unit 700a for attachment of output unit 700 to surface 110, however, such an implementation would not be conducive to convenient detachment and reattachment of output unit 700a to surface 110. In an implementation not depicted in FIG. 4B, one or mounting flanges may be comprised by output unit 700a and provide mounting holes for use in conjunction with fasteners suitable for the underlying construction of surface 110. Input unit 900 may be removably attached to existing outlet 130 with a motion which may be indicated by arrow 132. Existing outlet 130 may comprise an existing outlet upper receptacle 134 and an existing outlet lower receptacle 136. Mounting plate 120 may be located in one of a plurality of locations such that when input unit 900 is attached to existing outlet 130 and output unit 700a is attached to mounting plate 120 the distance between, and the positional orientations of input unit 900 and output unit 700a, satisfy a physical constraint of electrical interconnect 800.

Figure 4C:
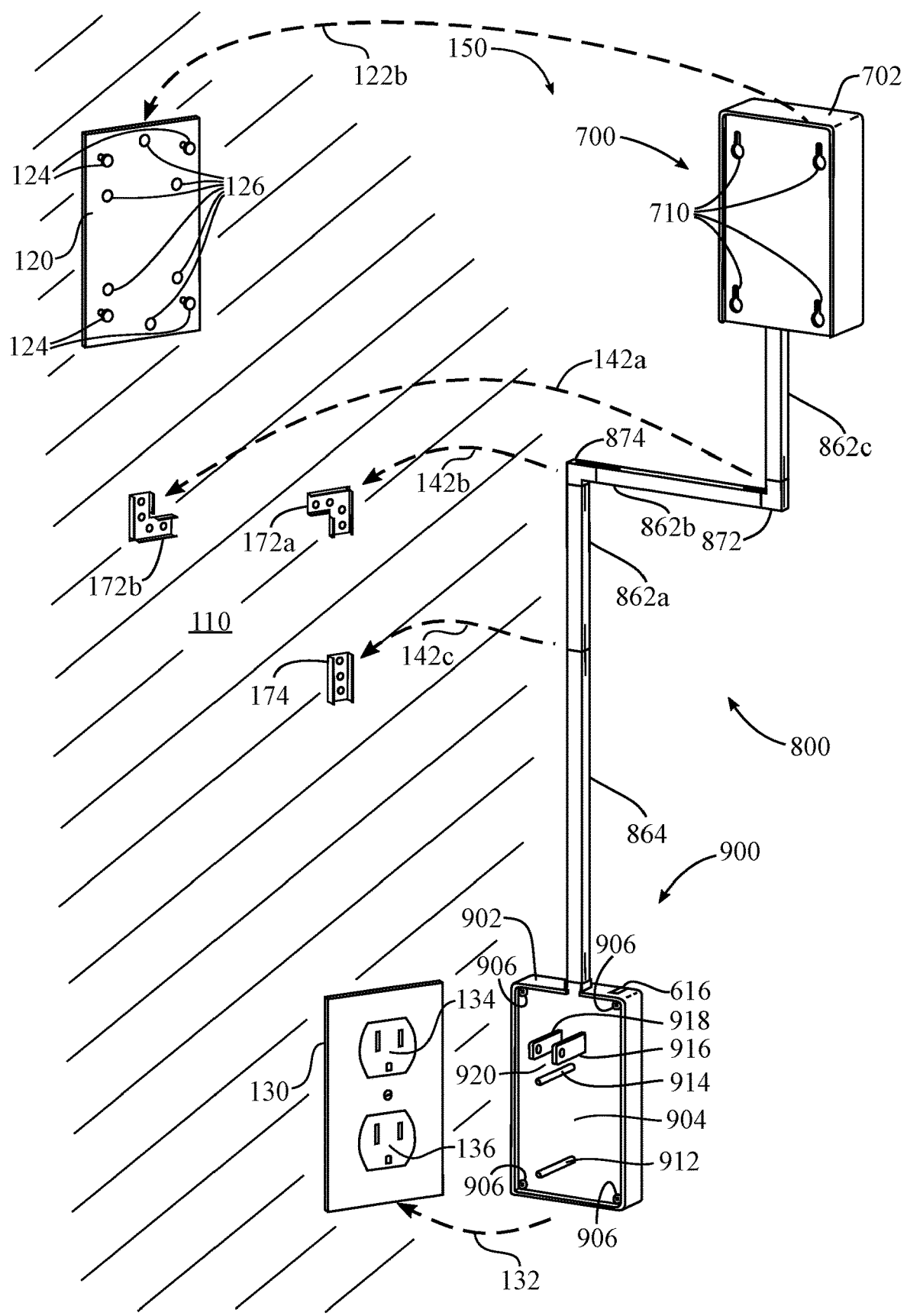
FIG. 4C depicts the example implementation of FIG. 4B, wherein the modular electrical apparatus is rotated to provide a rear view of the apparatus.

FIG. 4C is a perspective view of modular electrical apparatus 150 separated from surface 110 and rotated such that a back of output unit 700 (mounting plate 120 facing side) and a back of input unit 900 (existing outlet 130 facing side) are visible. Input unit 900 may comprise an electrical plug 920 which may plug into upper receptacle 134 of existing outlet 130. Electrical plug 920 may comprise a ground prong 914, a neutral prong 916 and a hot prong 918. In some implementations, input unit 900 may comprise a redundant ground prong 912 which may plug into the ground socket of existing outlet lower receptacle 136. When electrical plug 920 is plugged into existing outlet 130, input unit 900 may serve to cover and conceal existing outlet 130. In some implementations, input unit 900 may not comprise redundant ground prong 912. In some implementations, input unit 900 may comprise a non-electrically operative neutral prong and hot prong (not shown in FIG. 4C), e.g., prongs consisting of hard plastic, or if metal, not electrically connected to electrical interconnect 800, which plug into existing outlet lower receptacle 136 and provide mechanical retention and/or mechanical support for input unit 900. In some implementations, input unit 900 may comprise a fastener (not shown), such as a captive fastener retained by input unit 900 but externally accessible from the front of input unit 900 for rotation, or a fastener inserted into the front and though input unit 900 and accessible for rotation, to screw into threads of an existing outlet, such as outlet plate screw threads of existing outlet 130, wherein such a fastener may secure input unit 900 to existing outlet 130. In some implementations, the fastener may comprise a head that may be actuated by a screwdriver or other such tool. In some implementations, the fastener may comprise a head with a hand operable fastener head, such as a head comprising wings as commonly used in wing nuts, or a foldup tab, swivel-attached to the hand operable head, or the like, wherein tools are not required to secure or remove input unit 900 from screw threads of existing outlet 130. Input unit 900 may further comprise a back plate 904 and one or more back plate fasteners, such as back plate screws 906, wherein back plate screws 906 may secure back plate 904 to an input unit housing 902. The back of output unit 700 comprises output unit mounting holes (mounting holes) 710 which may accept a head of a mounting plate stud 124 and slide down over the stud shaft and capture the head behind a slot, thereby removably attaching output unit 700 to mounting plate 120. In the example implementation of FIG. 1C four such mounting plate studs 124 and four such output unit mounting holes 710 are depicted. In other implementations other numbers of mounting plate studs 124 and mounting holes 710 are possible, such as for example, two or three mounting plate studs 124 and/or mounting holes 710. In an implementation not depicted in FIG. 4C, a mounting plate 120 may not be used, and studs, or raised screws (not fully seated screws) may be secured to surface 110, wherein mounting holes 710 and input unit 700 would be removably attached thereto. In such an implementation, output unit could be detached/removed and reattached without the need for tools.

Figure 5A:
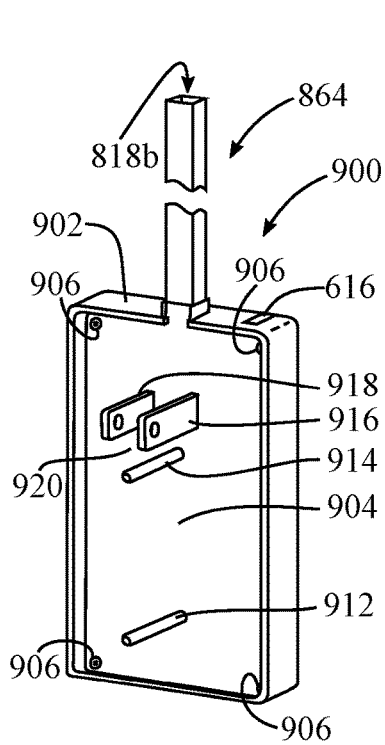
FIG. 5A is a perspective rear view of an example implementation of a modular input unit with a straight interconnect module connected thereto.
Figure 5B:
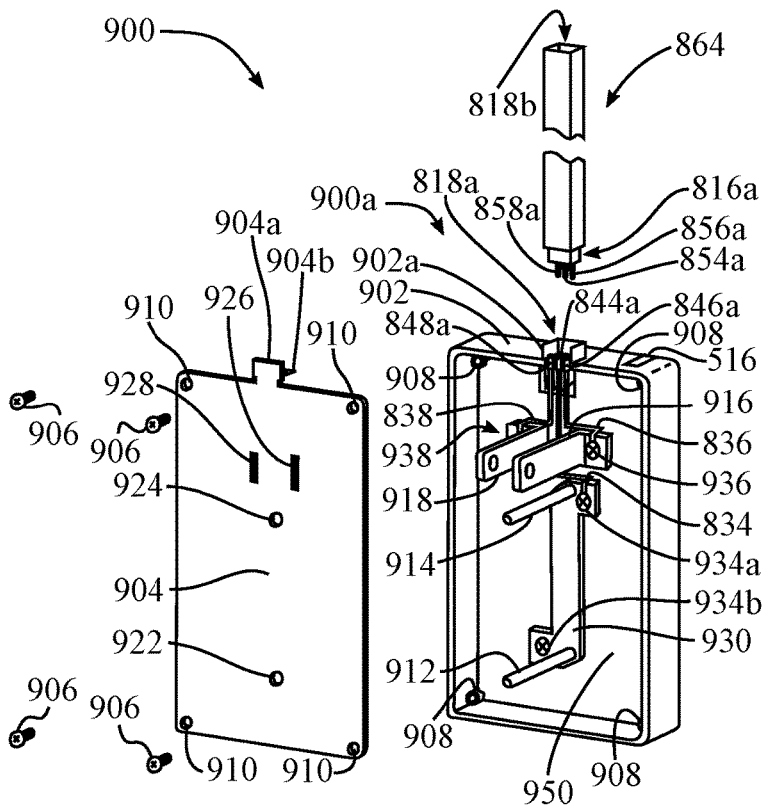
FIG. 5B is a perspective rear view of the example implementation of FIG. 5A with the straight interconnect module, back plate screws and a back plate removed to provide a view of an assembly of the modular input unit.

FIG. 5A is a perspective rear view of an example implementation of an input unit 900 and a type B straight interconnect module 864 connected thereto. Type B straight interconnect module 864 may comprise a modular interconnect socket 818b. FIG. 5B a perspective rear view of input unit 900 and type B straight interconnect module 864 with back plate screws 906 and a back plate 904 removed and provides a view of an assembly 900a. Type B straight interconnect module 864 may be unplugged from a modular interconnect socket 818a which may be comprised by input unit 900. Back plate 904 may comprise back plate screw holes 910, a redundant ground prong hole 922 a ground prong hole 924, a neutral prong hole 926 and a hot prong hole 928. Assembly 900a may comprise input unit housing 902 which may comprise assembled therein: a ground prong strap 930, comprising redundant ground prong 912 and ground prong 914, wherein ground prong strap 930 may be secured by fasteners, such as two ground screws 934a and 934b, wherein one ground screw 934b may secure an end of an input ground jumper 834 to ground prong strap 930, and another end of input ground jumper 834 may comprise a ground pin socket 844a located within a modular interconnect pin socket 818a comprised by input unit 900; neutral prong 916, wherein neutral prong 916 may be secured by a fastener, such as a neutral screw 936, wherein neutral screw 936 may secure an end of an input neutral jumper 836 to neutral prong 916 and another end of input neutral jumper 836 may comprise a neutral pin socket 846a located within modular interconnect socket 818a comprised by input unit 900; and hot prong 918, wherein hot prong 918 may be secured by a fastener, such as a hot screw 938, wherein hot screw 938 may secure an end of an input hot jumper 838 to hot prong 918 and another end of input hot jumper 838 may comprise a hot pin socket 848a located within modular interconnect socket 818a comprised by input unit 900. A circuit board 950 may also be installed within input housing 902 and may be secured by ground screws 934a and 934b, neutral screw 936 and/or hot screw 938 which may also secure ground prong strap 930, neutral prong 916 and hot prong 918, and may also secure input ground jumper 834, input neutral jumper 936 and input hot jumper 938. Housing 902 may comprise back plate mounting bosses 908 which may accept back plate mounting screws 906. Back plate 904 may be assembled to housing 904 by passing prongs 912, 914, 916 and 916 though prong holes 922, 924, 926 and 926 and passing back plate screws 906 through back plate screw holes 910 and securing back plate screws 906 to back plate mounting bosses 908. An upper tab 904a of back plate 904 forms a back wall of interconnect socket 818a. A pin socket wall 904b comprising holes for pin access to pin sockets 854a, 856a and 858a comprised by interconnect socket 818a, protrudes from upper tab 904a and forms a pin socket wall covering pin sockets 844a, 846a and 848a, wherein plug pins, such as pins 854a, 856a and 858a of interconnect plug 816a may access pin sockets 844a, 846a and 848a through pin socket wall 904b.

Figure 5C:
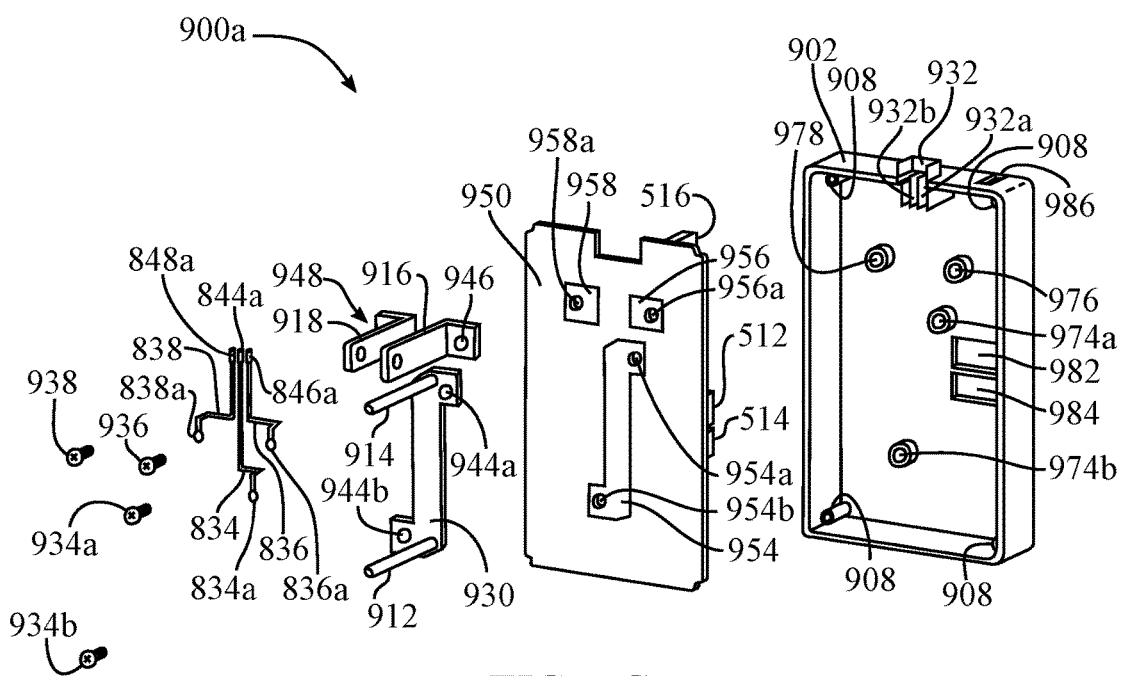
FIG. 5C is an exploded view of the assembly of the modular input unit of FIG. 5B.

FIG. 5C is an exploded view of assembly 900a of FIG. 5B and may illustrate an example implementation of assembly 900a in a disassembled state, wherein: ground screws 934a and 934b, neutral screw 936 and hot screw 938 may be removed; input ground jumper 934, input neutral jumper 936 and input hot jumper 938 may be removed; ground prong strap 930, neutral prong 914 and hot prong 918 may be removed; and circuit board 950 may be removed. Input unit housing 902 may comprise mounting bosses to receive screws 934a, 934b, 936 and 948, namely, ground strap mounting bosses 974a and 974b, a neutral prong mounting boss 976 and a hot prong mounting boss 978. Circuit board 950 may comprise a ground strap pad 954, neutral prong pad 956 and hot prong pad 958 on which ground bar 930, neutral prong 916 and hot prong 914 may be mounted, respectively, such that electrical connection may be made therebetween and electrical power and electrical ground may be received by circuit board 950 from a connected existing outlet 130 via pads 954, 956 and 958. Circuit board 950 may comprise ground strap circuit board holes 954a and 954b, a neutral prong circuit board hole 956a and a hot prong circuit board hole 958a to allow screws 934a, 934b, 936 and 938 to pass through circuit board 950. In some implementations, circuit board 950 may comprise a GFCI and other circuitry such as an indicator circuit and an indicator, such as one or more LED indicators 616, which may indicate a status, including a status of electrical power available at prongs 916 and 918, and a status of a GFCI switch, such as an open switch resulting from an occurrence of a ground fault, a GFCI test circuit and a test button 614 and a GFCI reset circuit and a reset button 612. In such an implementation, input unit housing 902 may comprise a GFCI reset button opening 982, a GFCI test button opening 984 and an indicator opening 986. A GFCI circuit may be implemented similar to an implementation disclosed in an FAN4147 Datasheet, dated March, 2013, wherein a FAN4147 is a ground fault interrupter controller marketed by Fairchild Semiconductor and the aforementioned datasheet discloses a typical application of the FAN4147 controller.

To assemble assembly 900a, circuit board 950 may be inserted into input housing 902 on top of bosses 974a, 974b, 976 and 978; ground prong strap 930 comprising ground prongs 912 and 914, neutral prong 916 and hot prong 918 may be installed on pads 954, 956 and 958 of circuit board 950; input ground jumper 934, input neutral jumper 936 and input hot jumper 938 may be placed on ground prong strap 930, neutral prong 916 and hot prong 918. Screws may then be used to secure assembly 900a as follows: ground screw 934a may pass through an input ground jumper mounting hole 834a, through a ground strap mounting hole 944a, through ground strap circuit board mounting hole 954a and into ground strap mounting boss 974a; ground screw 934b may pass through a ground strap mounting hole 944b, through ground strap circuit board mounting hole 954b and into ground strap mounting boss 974b; neutral screw 936 may pass through an input neutral jumper mounting hole 836a, through a neutral prong mounting hole 946, through neutral prong circuit board mounting hole 956a and into neutral prong mounting boss 976; and hot screw 938 may pass through an input hot jumper mounting hole 838a, through a hot prong mounting hole 948, through hot prong circuit board mounting hole 958a and into hot prong mounting boss 978.

Input unit housing 902 may comprise an input unit interconnect socket housing 932 which may comprise a separator 932a and a separator 932b, wherein interconnect socket housing 932, separator 932a and separator 932b may house and separate ground pin socket 844a, neutral pin socket 846a and hot pin socket 848a, provide electrical insulation therebetween, may be configured to provide mechanical support therefor, and may, in conjunction with back plate 904, collectively form an interconnect socket 818a which may receive an interconnect plug, such as interconnect plug 816a. In an implementation where modular electrical apparatus 150 may comprise a GFCI, input unit housing 902 may comprise a GFCI reset button opening 982, a GFCI test button opening 984 and an indicator opening 986.

Implementations of a modular input unit 900 as described are illustrative and many implementations are possible. Various materials and constructions are possible. Components such as housing 902 and back plate 904 which may restrict access to electrical power, such as to restrict unintentional contact with an electrified component, may be constructed of an electrically insulating, durable and rigid material, such as for example, an electrically insulating plastic resin, and may be manufactured, for example, using a thermoforming process such as an injection molding process, and may be manufactured of an Underwriters Laboratories (UL) recognized flame retardant material, such as a UL 94V-0 (burning stops within 10 seconds on a vertical specimen; drips of particles allowed as long as they are not inflamed) rated material. Other components which are configured to conduct electrical power, such as prongs 912, 914, 916 and 918, and input jumpers 834, 836 and 838 may be constructed of metals, such as brass (which is a harder metal than copper and may provide for low wear and durability), and be configured to provide a low impedance electrical path and have a capacity to conduct 15 amperes of electrical current when connected to an existing outlet of a branch circuit.

Figure 6A:
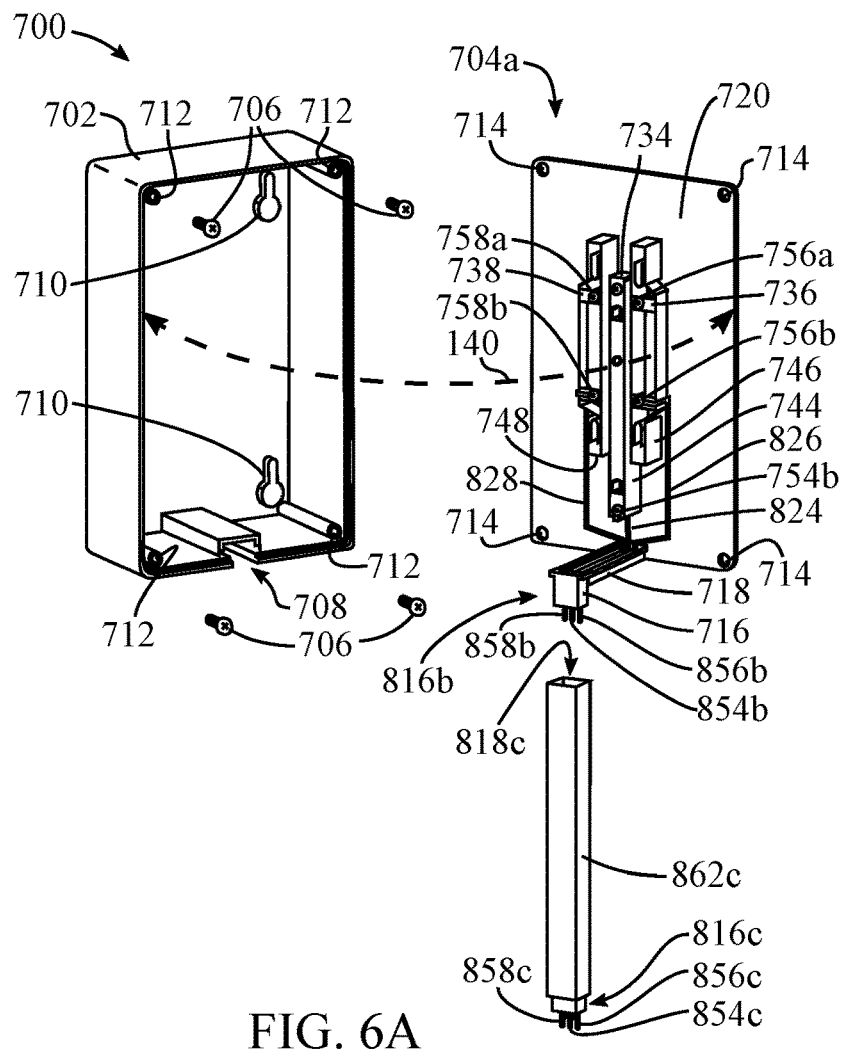
FIG. 6A is a perspective view of an example implementation of a modular output unit and a straight interconnect module, wherein the straight interconnect module and front assembly screws are removed and a front assembly is rotated to provide a rear view of the front assembly.

FIG. 6A is a perspective view of an example implementation of an output unit 700, wherein front assembly screws 706 may be removed, front assembly 704a may be removed from housing 702 in a motion that may be indicated by an arrow 140, and front assembly 704a may be depicted in a rear view. Front assembly 704a may comprise: a front plate 720 a ground busbar 734 secured to a ground busbar housing 744, wherein the ground busbar 734 may be secured using one or more fasteners, such as a ground busbar upper mounting screw 754a and a ground busbar lower mounting screw 754b; a neutral busbar 736 secured to a neutral busbar housing 746, wherein the neutral busbar 736 may be secured using one or more fasteners, such as a neutral busbar upper mounting screw 756a and a neutral busbar lower mounting screw 756b; and a hot busbar 738 secured to a hot busbar housing 748, wherein the hot busbar 738 may be secured using one or more fasteners, such as a hot busbar upper mounting screw 758a and a hot busbar lower mounting screw 758b. Fasteners, such as screws 754a, 754b, 756a, 756b, 758a and 758b may also secure an electrical connection to busbars 734, 736 and 738. In the example implementation depicted in FIG. 6A, front assembly 704a may comprise an output ground jumper 824, an output neutral jumper 826, an output hot jumper 828 and an interconnect plug frame 716, wherein one end of output jumpers 824, 826 and 828 may be secured to busbars 734, 736 and 738 with screws 754b, 756b and 758b, respectively, and the other end of output jumpers 824, 826 and 828 may each comprise and terminate as a pin, namely, a ground pin 854b, a neutral pin 856b and a hot pin 858b, respectively. Pins 854b, 856b and 858b may be housed by interconnect plug frame 716 and collectively, at least in part or a portion thereof, form an interconnect plug 816b.

Figure 6B:
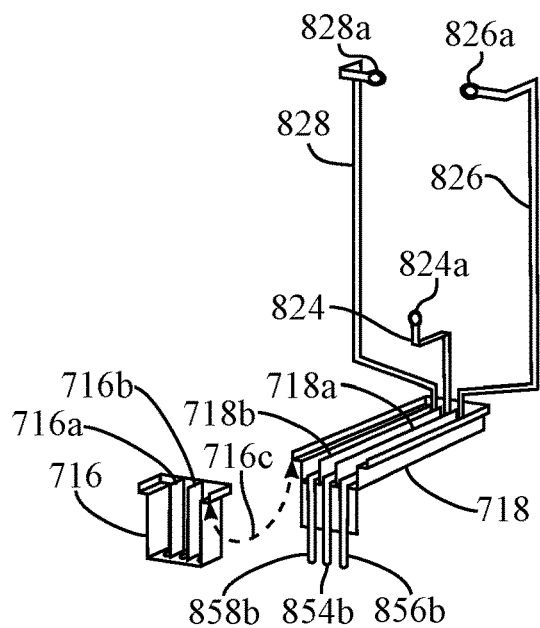
FIG. 6B is a perspective view of an interconnect plug frame, an interconnect jumper tray, an output ground jumper, an output neutral jumper and an output hot jumper, wherein interconnect plug frame is removed therefrom and rotated providing a view from a reverse side from the view depicted in FIG. 6A.

Turning briefly to FIG. 6B, FIG. 6B is a perspective view of an example implementation of an interconnect plug frame 716, interconnect jumper tray 718 and output ground jumper 824, output neutral jumper 826 and output hot jumper 828, wherein interconnect plug frame 716 may be removed therefrom in a motion that may be indicated by an arrow 716c and provide a view from a reverse side from the view depicted in FIG. 6A. Interconnect plug frame 716 and interconnect jumper tray 718 may comprise separators 716a and 716b, and 718a and 718b, respectively. Separators 716a and 718a, and 716b and 718b may separate and provide insulation between output neutral jumper 826 and output ground jumper 824, and output hot jumper 828 and output ground jumper 824, respectively. Interconnect plug frame 716 may comprise a pin wall 716d, which may comprise holes through which pins 854b, 856b and 858b may pass. Collectively, at least portions of interconnect plug frame 716, interconnect jumper tray 718 and pins 854b, 856b and 858b may form interconnect plug 816b. Output jumper 824, 826 and 828 may comprise on opposing ends from pins 854b, 856b and 858b, output jumper mounting holes 824a, 826a and 828a, respectively, through which fasteners, such as screws 754a and 754b, 756a and 756b, and 758a and 758b may pass to secure an electrical and mechanical connection to busbars 734, 736 and 738. Returning to FIG. 6A, output unit housing 702 may comprise an output unit plug retention slot 708, which may receive interconnect plug frame 716, an interconnect jumper tray 718, and portions of output ground jumper 824, output neutral jumper 826 and output hot jumper 828, wherein, at least portions of interconnect plug frame 716, jumper tray 718, ground pin 854b, neutral pin 856b and hot pin 818b may form interconnect plug 816b and extend downward from output unit plug retention slot 708 and be available for a mating connection to an interconnect socket, such as interconnect socket 818c of type A straight module 862c.

Output unit housing 702 may comprise front assembly mounting bosses 712 and front assembly 704a may comprise front assembly mounting holes 714, wherein front assembly 704a may be located to position front assembly mounting holes 714 on front assembly mounting bosses 712 and secure thereto with front assembly screws 706. In the example implementation depicted in FIG. 6A, two of four output unit mounting holes 710 depicted in FIG. 4C are visible. Output unit mounting holes 710 may comprise an interior wall such that an object may not be easily inserted into output unit 700 and potentially make contact with an electrified component therein.

Figure 6C:
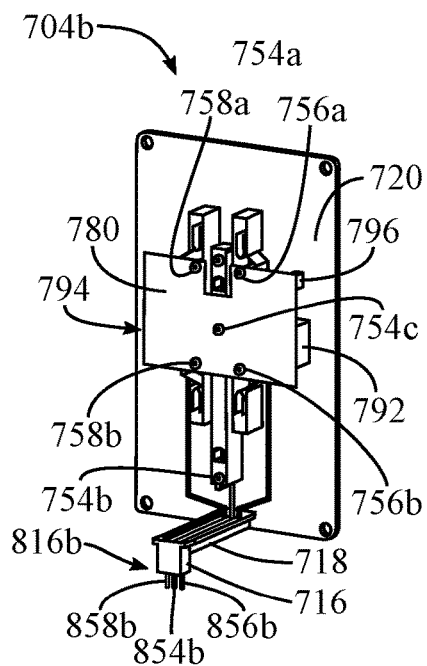
FIG. 6C is a perspective rear view of an example implementation of a front assembly of a modular output unit comprising a circuit board, USB power ports and an indicator.

FIG. 6C depicts a possible implementation of front assembly 704b of apparatus 150a depicted in FIG. 4B, wherein a circuit board 780 may comprise USB power port 792 and USB power port 794 (not visible in FIG. 6C), and indicator 796. Circuit board may be secured in assembly 704b by a ground screw 754c, neutral screws 756a and 756b and hot screws 758a and 758b, and may be positioned over, and may be in electrical contact with output jumpers 824, 826 and 828 and/or busbars 734, 736 and 738 such that circuit board 780 may receive electrical power and electrical ground therefrom.

Figure 6D:
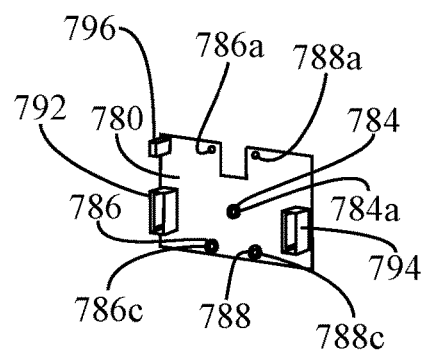
FIG. 6D is a perspective front view of the circuit board of FIG. 6C.

FIG. 6D depicts a perspective view of a front side of circuit board 780. Circuit board 780 may comprise a ground pad 784, a neutral pad 786 and a hot pad 788. Circuit board 780 may comprise a ground circuit board hole 784a, an upper neutral circuit board hole 786a, a lower neutral circuit board hole 786c, an upper hot circuit board hole 788a and a lower hot circuit board hole 788c. Circuit board 780 may comprise a two USB power ports 792 and 794 and an indicator 796 and circuitry to generate an indicator status and convert electrical power made available via pads 786 and 788 from alternating current to 5 volt direct current made available at USB power ports 792 and 794. In an implementation, a control of indicator 796 may originate in input unit 900 and be interconnected to circuit board 780 of output unit 700a via electrical conductor(s) comprised by modular electrical interconnect 800, wherein such control may indicate status of a GFCI circuit comprised by input unit 700.

Figure 6E:
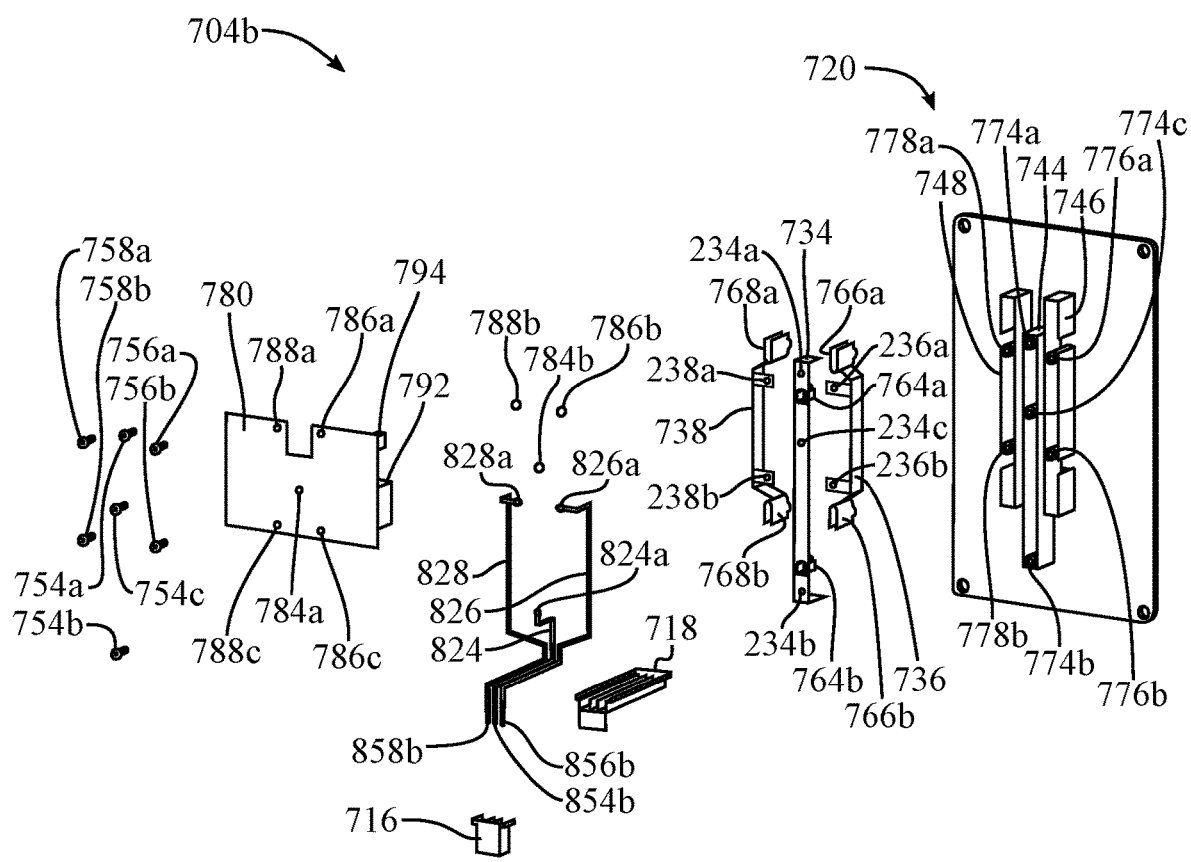
FIG. 6E is an exploded rear view of the front assembly of the example implementation of FIG. 6C.

FIG. 6E depicts an exploded rear perspective view of front assembly 704b. Front assembly 704b may comprise a front plate 720 which may comprise: a ground busbar upper mounting boss 774a, a ground busbar lower mounting boss 774b and a middle ground busbar mounting boss 774c, each of which may be located within ground busbar housing 744; a neutral busbar upper mounting boss 776a, a neutral busbar lower mounting boss 776b, each of which may be located within neutral busbar housing 746; and a hot busbar upper mounting boss 778a and a hot busbar lower mounting boss 778b, each of which may be located within each of which may be located within hot busbar housing 748. Ground busbar mounting screws 754a, 754b and 754c, neutral busbar mounting screw 756a and 756b and hot busbar mounting screws 758a and 758b may secure components of assembly 704b as depicted in FIG. 6C by securing them to mounting bosses 774a, 774b, 774c, 776a, 776b, 778a and 778b, and may be removed therefrom, and the following components may be removed as depicted in FIG. 6E: ground busbar 734, neutral busbar 736, hot busbar 738, output ground jumper 824, output neutral jumper 826 and output hot jumper 828 and circuit board 780. Interconnect plug frame 716 and interconnect jumper tray 718 may also be removed from output jumpers 824, 826 and 828.

Ground busbar 734 may comprise an upper ground prong socket 764a, a lower ground prong socket 764b, an upper mounting hole 734a, a lower mounting hole 734b and a middle mounting hole 734c. Neutral busbar 736 may comprise an upper neutral prong socket 766a, a lower neutral prong socket 766b, an upper mounting hole 736a and a lower mounting hole 736b. Hot busbar 738 may comprise an upper hot prong socket 768a, a lower hot prong socket 768b, an upper mounting hole 738a and a lower mounting hole 738b. To assemble assembly 704b: busbars 734, 736 and 738 may be positioned over and/or within busbar housings 744, 746 and 748, respectively, namely, prong sockets 764(a and b), 766(a and b) and 768(a and b) may be positioned within housings 744, 746 and 748, respectively and busbar mounting holes 734*a*, 734*b*, 734*c*, 736*a*, 736*b*, 738*a* and 738*b* and may be positioned over mounting bosses 774*a*, 774*b*, 774*c*, 776*a*, 776*b*, 778*a* and 778*b*, respectively; output jumpers 824, 826 and 820 may be positioned over busbars 734, 726 and 738, respectively, and jumper mounting holes 824*a*, 826*a* and 828*a* may be placed over busbar mounting holes 734*c*, 736*b* and 738*b*, respectively; spacers 784*b*, 786*b* and 788*b* may be placed over busbar mounting holes 734*a*, 736*a* and 738*a*, respectively; circuit board 780 may be placed over the assembly stack, wherein circuit board holes 784*a*, 784*b*, 784*c*, 786*a*, 786*b*, 788*a* and 788*b* may be aligned with mounting bosses 774*a*, 774*b*, 774*c*, 776*a*, 776*b*, 778*a* and 778*b*, respectively; and screws 754*a*, 754*b*, 754*c*, 756*a*, 756*b*, 758*a* and 758*b* may be inserted therein, respectively, and pass through the stack assembly of circuit board/holes, jumpers/mounting holes or spacers, busbars/mounting holes and into mounting bosses to secure components of assembly 704*b* as depicted in FIG. 6C. Also referring to FIGS. 4B and 6A, to assemble output unit 700*a* of modular electrical apparatus 150*a*, interconnect jumper tray 718 and interconnect plug frame 716 can be assembled to output jumpers 824, 826 and 828 and be inserted into output unit interconnect plug and tray slot 708, and front assembly screws 706 may be inserted through front assembly mounting holes 714 and into front assembly mounting bosses 712.

Implementations of a modular output unit 700 and a modular output unit 700*a* as described are illustrative and many implementations are possible. Various materials and constructions are possible. Components such as housing 702 and front plate 720 which may restrict access to electrical power, such as to restrict unintentional contact with an electrified component, may be constructed of an electrically insulating, durable and rigid material, such as for example, an electrically insulating plastic resin, and may be manufactured, for example, using a thermoforming process such as an injection molding process, and may be manufactured of an Underwriters Laboratories (UL) recognized flame retardant material, such as a UL 94V-0 (burning stops within 10 seconds on a vertical specimen; drips of particles allowed as long as they are not inflamed) rated material. Other components which are configured to conduct electrical power, such as busbars 734, 736 and 738, and output jumpers 824, 826 and 828 may be constructed of metals, such as brass (which is a harder metal than copper and may provide for low wear and durability), and be configured to provide a low impedance electrical path and have a capacity to conduct 15 amperes of electrical current when electrically connected to an existing outlet of a branch circuit.

Figure 7A:
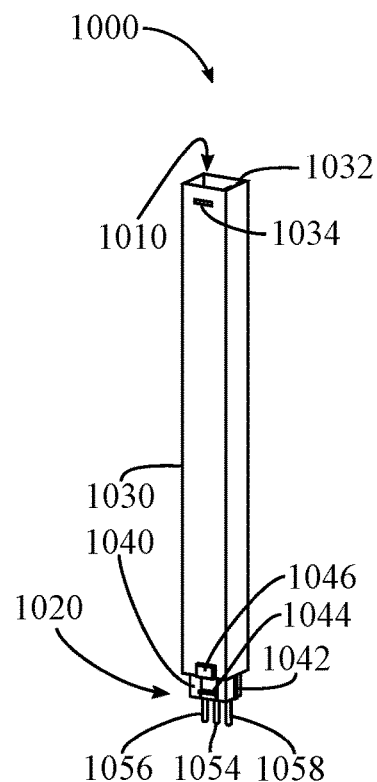
FIG. 7A is a perspective view of an example implementation of a straight interconnect module.

FIG. 7A is a perspective view of an example implementation of a straight interconnect module 1000. Straight interconnect module 1000 may comprise an interconnect socket 1010, an interconnect plug 1020, an outer sleeve 1030, a key 1032, a lock catch 1034, an inner sleeve housing 1040, a key tab 1042, a lock tab 1044, a lock release 1046, a ground pin 1054, a neutral pin 1056 and a hot pin 1058.

Figure 7B:
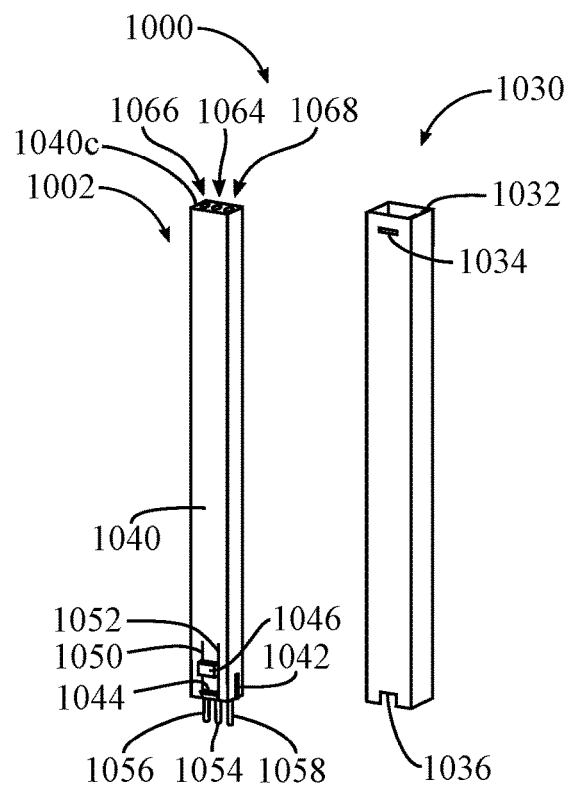
FIG. 7B is a perspective view the example implementation of FIG. 7A, wherein an outer sleeve is not be assembled to an inner assembly.

FIG. 7B is a perspective view of interconnect module 1000 wherein outer sleeve 1030 may not be assembled to an inner assembly 1002. Inner assembly 1002 may comprise inner sleeve housing 1040, pins 1054, 1056 and 1058 and a ground pin socket 1064, a neutral pin socket 1066 and a hot pin socket 1068, wherein pin sockets 1064, 1066 and 1068 are within housing 1040, are not visible behind a pin socket wall 1040*c*, but are accessible by pins inserted through holes in pin socket wall 1040*c*. Inner sleeve housing 1040 may comprise key tab 1042, lock tab 1044, lock release 1046 and slit 1050 and slit 1052. Slits 1050 and 1052 may permit a travel inward of lock tab 1044 when lock release 1046 is pressed inward (towards the longitudinal axial of inner assembly 1002). Two interconnected interconnect modules, wherein an interconnect plug 1020 of a first module 1000 is plugged into an interconnect socket 1010 of a second module 1000, may comprise a lock tab 1044 of the first module 1000 engaged with a lock catch 1034 of the second module 1000, thereby securing the first module 1000 together with the second module 1000. Pressing a lock release 1046 of the first module 1000 may cause lock tab 1044 of the first module 1000 to travel inward and disengage from lock catch 1034 of the second module 1000 and permit a separation of the first module 1000 and the second module 1000. A thinning of the wall of housing 1040 above lock release 1046 and between slits 1050 and 1052 may facilitate an easier actuation of a lock release action. Outer sleeve 1030 may comprise key 1032, lock catch 1034 and a notch 1036, wherein notch 1036 may be situated around portions of lock release 1046 when outer sleeve 1030 is assembled with inner assembly 1002 as depicted in FIG. 7A. Two interconnected interconnect modules, wherein an interconnect plug 1020 of a first module 1000 is plugged into an interconnect socket 1010 of a second module 1000, may comprise a key tab 1042 of the first module 1000 engaged with a key 1032 of the second module 1000, wherein an interconnection of the first module in a rotated orientation of 180 degrees about its longitudinal axis is prevented by a misalignment of key tab 1042 of the first module 1000 and the key 1032 of the second module 1000.

Figure 7C:
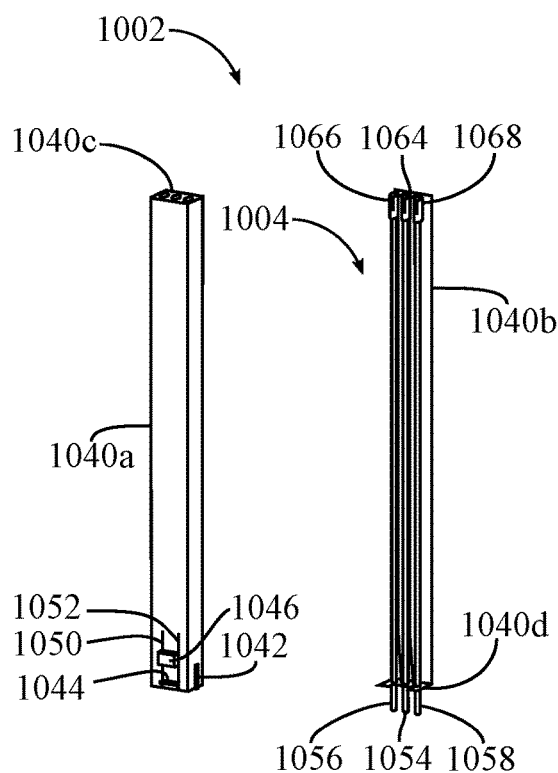
FIG. 7C is a perspective view of the inner assembly of FIG. 7B partially unassembled, wherein a front housing is not assembled to a subassembly.

FIG. 7C is a perspective view of inner assembly 1002, wherein: an inner sleeve housing cover 1040*a* and an inner sleeve housing frame 1040*b* may be separated and inner sleeve housing frame 1040*b* may be comprised by a subassembly 1004. Inner sleeve housing cover 1040*a* may comprise pin socket wall 1040*c*. Inner sleeve housing frame 1040*b* may comprise a pin wall 1040*d*. Subassembly 1004 may comprise inner sleeve housing frame 1040*b*, wherein pin sockets 1064, 1066 and 1068 are visible, and pins 1054, 1056 and 1058 extend through holes in pin wall 1040*d*.

Figure 7D:
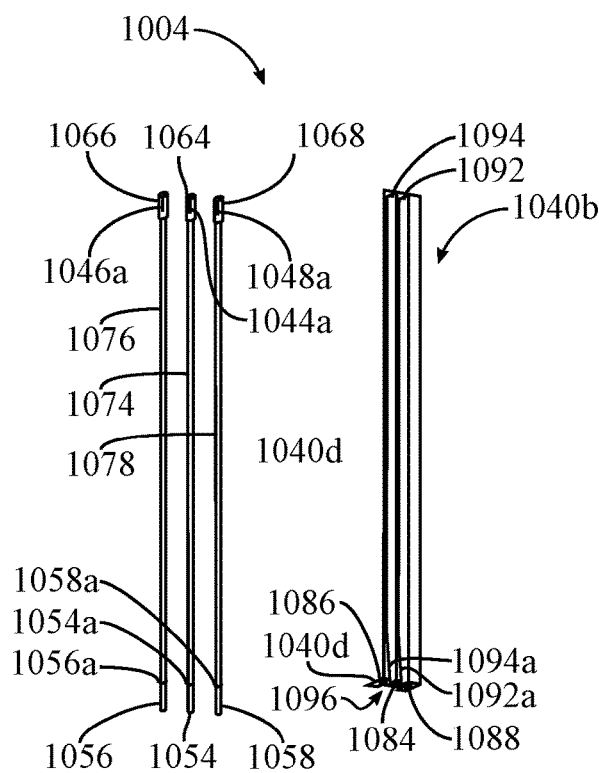
FIG. 7D depicts an exploded view of the subassembly of FIG. 7C.

FIG. 7D is a perspective view of subassembly 1004 wherein a ground conductor 1074, a neutral conductor 1076 and a hot conductor 1078 may be removed from inner sleeve housing frame 1040*b*. Inner sleeve housing frame 1040*b* may comprise a conductor separator 1092 which may separate an installed hot conductor 1078 from an installed ground conductor 1072, and a conductor separator 1094 which may separate and installed ground conductor 1074 from an installed neutral conductor 1076. Conductor separators 1092 and 1094 may have wall sections with sloping wall heights 1092*a* and 1094*a*, and pin wall 1040*d* may have a notch 1096, wherein sloping wall heights of sections 1092*a* and 1094*a* and notch 1096 may permit an inward travel of lock tab 1044 when lock release 1046 is depressed in an inward direction. Conductors 1074, 1076 and 1078 may comprise on one end pins 1054, 1056 and 1058, respectively, and on the other end, pin sockets 1064, 1066 and 1068, respectively. Pins 1054, 1056 and 1058 may comprise a flange 1054*a*, 1056*a* and 1058*a*. Pin wall 1040*d* may comprise a ground pin hole 1084, a neutral pin hole 1086 and a hot pin hole 1088, wherein pin holes 1084, 1086 and 1088 may comprise a geometry sufficient to accept an insertion of pins 1054, 1056 and 1058 to pass through but not accept pin flanges 1054*a*, 1056*a* and 1058*a* to pass through. Pin sockets 1064, 1066 and 1068 of a first interconnect module 1000 may be configured to receive pins 1054, 1056 and 1058 of a second interconnect module, and may comprise slits 1064*a*, 1066*a* and 1068*a*, wherein slits 1064*a*, 1066*a* and 1068*a* may allow a resilient spreading of pin socket openings and walls to allow entry of pins 1054, 1056 and 1058, and maintain a resilient compression force between walls of pin sockets 1064, 1066 and 1068 directed inward against pin walls of received pins therein.

A straight interconnect module of the example implementation of FIG. 7A, FIG. 7B, FIG. 7C and FIG. 7D may be assembled as follows: pins 1054, 1056 and 1058 of conductors 1074, 1076 and 1078 may be inserted through holes 1084, 1086 and 1088 of pin wall 1040*d* until flanges 1054*a*, 1056*a* and 1058*a* prevent further insertion as conductors 1074, 1076 and 1078 are placed in inner sleeve housing frame 1040*b*, adjacent to and separated by, separators 1092 and 1094, thereby forming subassembly 1004; inner sleeve housing cover 1040*a* may be assembled to inner sleeve housing frame 1040 of subassembly 1004, thereby forming inner assembly 1002 and securing conductors 1074, 1076 and 1088 therein, within pin wall 1040*d*, pin socket wall 1040*c*, inner sleeve housing cover 1040*a* and inner sleeve housing frame 1040*b*, wherein pins 1054, 1056 and 1058 protrude externally though pin wall 1040*d* and pin sockets 1064, 1066 and 1068 abut an underside of pin socket wall 1040*c* and may be accessible by a pin inserted through a hole in pin socket wall 1040*c*; and outer sleeve 1030 may be slid over inner assembly 1002 until lock release 1046 may be located within notch 1036 of outer sleeve 1030, thereby forming straight interconnect module 1000.

Locking and keying features disclosed above, such as lock catch 1034, lock tab 1044, lock release 1046, key 1032, key tab 1042, and the like, may be provided on interconnect socket 818*a* of modular input unit 900 and interconnect plug 816*b* of output units 700 and 700*a*, as well as interconnect plugs and interconnect sockets of straight interconnects 862*a*, 862*b*, 862*c* and 864, and angled interconnects 872 and 872 depicted in whole or in part, or inferable in FIGS. 4A, B and C, 5A, B and C and 6A, B, C and E.

Figure 8A:
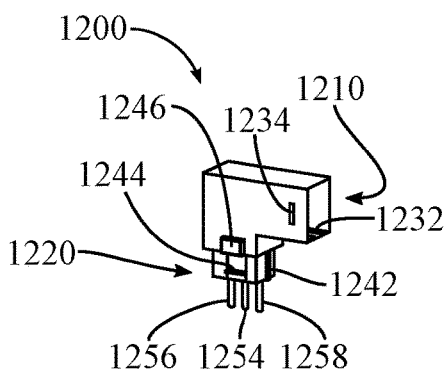
FIG. 8A is a perspective view of an example implementation of an angled interconnect module.

FIG. 8A is a perspective view of an example implementation of an angled interconnect module 1200. Angled interconnect module 1200 may comprise an interconnect socket 1210, an interconnect plug 1220, a key 1232, a lock catch 1234, a key tab 1242, a lock tab 1244, a lock release 1246, a ground pin 1254, a neutral pin 1256 and a hot pin 1258.

Figure 8B:
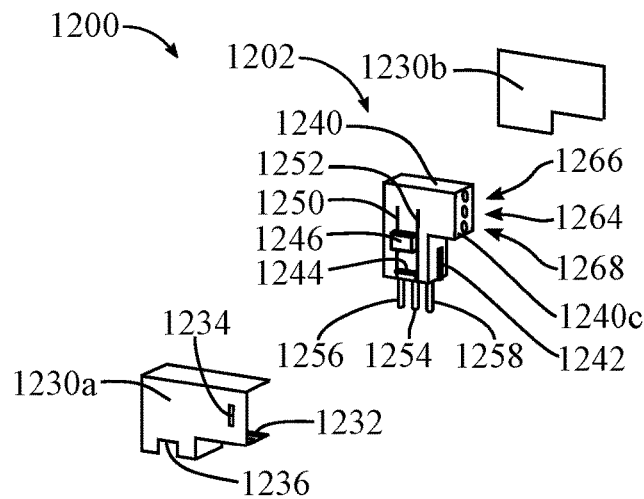
FIG. 8B is a perspective view the example implementation of FIG. 8A, wherein an outer housing is not be assembled to an inner assembly.

FIG. 8B is a perspective view of interconnect module 1200, wherein an outer housing 1230*a* and a back plate 1230*b* may not be assembled to an inner assembly 1202. Inner assembly 1202 may comprise inner sleeve housing 1240, pins 1254, 1256 and 1258 and a ground pin socket 1264, a neutral pin socket 1266 and a hot pin socket 1268, wherein pin sockets 1264, 1266 and 1268 are within housing 1240, are not visible behind a pin socket wall 1240*c*, but are accessible by pins inserted through holes in pin socket wall 1240*c*. Inner sleeve housing 1240 may comprise key tab 1242, lock tab 1244, lock release 1246 and slit 1250 and slit 1252. Slits 1250 and 1252 may permit a travel inward of lock tab 1244 when lock release 1246 is pressed inward. A thinning of the wall of housing 1240 above lock release 1246 and between slits 1250 and 1252 may facilitate an easier actuation of a lock release action. Two interconnected interconnect modules, wherein an interconnect plug 1220 of a first module 1200 is plugged into an interconnect socket 1210 of a second module 1200, may comprise a lock tab 1244 of the first module 1200 engaged with a lock catch 1234 of the second module 1200, thereby securing the first module 1200 together with the second module 1200. Pressing a lock release 1246 of the first module 1200 may cause lock tab 1244 to travel inward and disengage from lock catch 1234 of the second module 1200 and permit a separation of the first module 1200 and the second module 1200. Outer housing 1230*a* may comprise key 1232, lock catch 1234 and a notch 1236, wherein notch 1236 may be situated around portions of lock release 1246 when outer housing 1230*a* is assembled with inner assembly 1202 as depicted in FIG. 8A. Two interconnected interconnect modules, wherein an interconnect plug 1220 of a first module 1200 is plugged into an interconnect socket 1210 of a second module 1200, may comprise a key tab 1242 of the first module 1200 engaged with a key 1232 of the second module 1200, wherein an interconnection of the first module in a rotated orientation of 180 degrees is prevented by a misalignment of key tab 1242 of the first module 1200 and the key 1232 of the second module 1200.

Figure 8C:
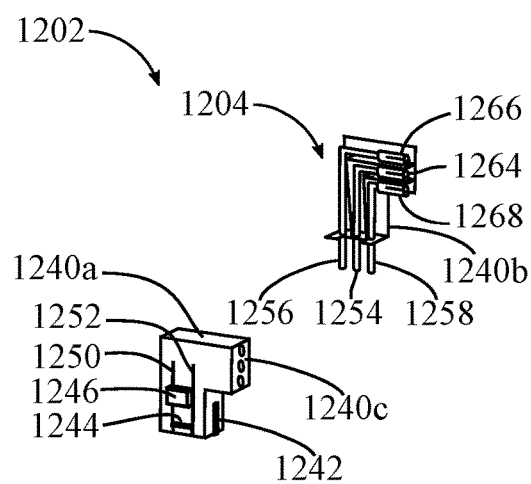
FIG. 8C is a perspective view of the inner assembly of FIG. 8B partially unassembled, wherein a front housing is not assembled to a subassembly.

FIG. 8C is a perspective view of inner assembly 1202, wherein: an inner sleeve housing cover 1240*a* and an inner sleeve housing frame 1240*b* may be separated and inner sleeve housing frame 1240*b* may be comprised by a subassembly 1204. Inner sleeve housing cover 1240*a* may comprise pin socket wall 1240*c*. Inner sleeve housing frame 1240*b* may comprise a pin wall 1240*d*. Subassembly 1204 may comprise inner sleeve housing frame 1240*b*, wherein pin sockets 1264, 1266 and 1268 are visible, and pins 1254, 1256 and 1258 extend through holes in pin wall 1240*d*.

Figure 8D:
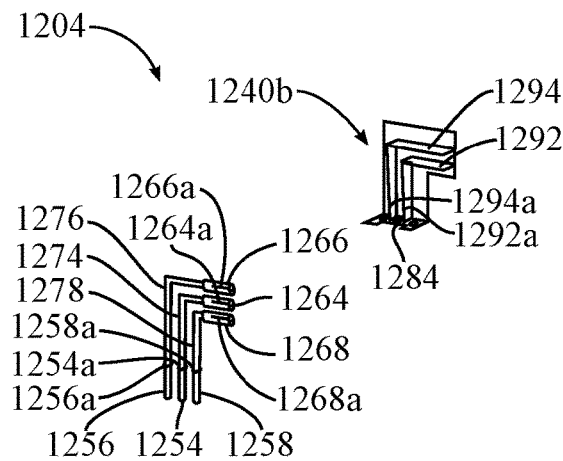
FIG. 8D depicts an exploded view of the subassembly of FIG. 8C.

FIG. 8D depicts a perspective view of subassembly 1204*a* wherein a ground conductor 1274, a neutral conductor 1276 and a hot conductor 1278 may be removed from inner sleeve housing frame 1240*b*. Inner sleeve housing frame 1240*b* may comprise a conductor separator 1292 which may separate an installed hot conductor 1278 from an installed ground conductor 1272, and a conductor separator 1294 which may separate and installed ground conductor 1274 for an installed neutral conductor 1276. Conductor separators 1292 and 1294 may have wall sections with sloping wall heights 1292*a* and 1294*a*, and pin wall 1240*d* may have a notch 1296, wherein sections with sloping wall heights 1292*a* and 1294*a* and notch 1296 may permit an inward travel of lock tab 1244 when lock release 1246 is depressed in an inward direction. Conductors 1274, 1276 and 1278 may comprise on one end pins 1254, 1256 and 1258, respectively, and on the other end, pin sockets 1264, 1266 and 1268, respectively. Pins 1254, 1256 and 1258 may comprise a flange 1254*a*, 1256*a* and 1258*a*. Pin wall 1240*d* may comprise a ground pin hole 1284, a neutral pin hole 1286 and a hot pin hole 1288, wherein pin holes 1254*a*, 1256*a* and 1258*a* may comprise a geometry sufficient to accept an insertion of pins 1254, 1256 and 1258 to pass through, but not allow pin flanges 1254*a*, 1256*a* and 1258*a* to pass through. Pin sockets 1264, 1266 and 1268 of a first module 1200 may be configured to receive pins 1254, 1256 and 1258 of a second module 1200, and may comprise slits 1264*a*, 1266*a* and 1268*a*, wherein slits 1264*a*, 1266*a* and 1268*a* may allow a resilient spreading of pin socket openings and walls to allow entry of pins 1254, 1256 and 1258, and maintain a resilient compression force between walls of pin sockets 1264, 1266 and 1268 directed inward against pin walls of received pins therein.

Figure 8E:
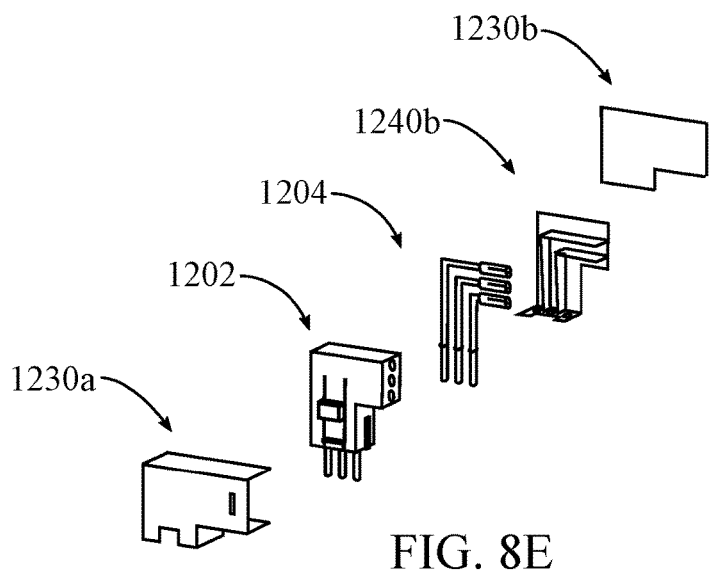
FIG. 8E is an exploded view of the example implementation of the angled interconnect module of FIG. 8A.

FIG. 8E is an exploded view of the example implementation of the angled interconnect module 1200 of FIG. 8A and FIG. 8B. An angled interconnect module of the example implementation of FIG. 8E may be assembled as follows: pins 1254, 1256 and 1258 of conductors 1274, 1276 and 1278 may be inserted through holes 1284, 1286 and 1288 of pin wall 1240*d* until flanges 1254*a*, 1256*a* and 1258*a* prevent further insertion as conductors 1274, 1276 and 1278 are placed in inner sleeve housing frame 1240*b*, adjacent to and separated by, separators 1292 and 1294, thereby forming subassembly 1204; inner sleeve housing cover 1240*a* may be assembled to inner sleeve housing frame 1240 of subassembly 1204, thereby forming inner assembly 1202 and securing conductors 1274, 1276 and 1288 therein, within pin wall 1240*d*, pin socket wall 1240*c*, inner sleeve housing cover 1240*a* and inner sleeve housing frame 1240*b*, wherein pins 1254, 1256 and 1258 protrude externally though pin wall 1240*d* and pin sockets 1264, 1266 and 1268 abut an underside of pin socket wall 1240*c* and may be accessible by a pin inserted through a hole in pin socket wall 1240*c*; and inner assembly 1202 may be assembled on top of back plate 1230*b*, and outer housing 1230*a* may be assembled over inner assembly 1202, thereby forming angled interconnect module 1200.

FIG. 9A is a perspective view of an implementation of an interconnect module 1400 which may comprise a flexible cable 1480 which electrically and mechanically interconnects an interconnect socket 1410 and an interconnect plug 1420, such that interconnect module 1400 can serve as a straight interconnect module when oriented with cable 1480 in a straight orientation and can serve as an angled interconnect module when cable 1480 is oriented in a curved orientation. Interconnect module 1400 may be manufactured using female and male crimp terminals applied to wire conductors of cable 1480 and housed in interconnect socket 1410 and interconnect plug 1420, respectively. Crimp terminals may be similar to crimp terminals, such as those marketed by Molex Incorporated, for example, those marketed as part of their VersaBlade Connector System which may support power transmission up to 300 Volts and 15.0 Amps, such as for example, female crimp terminal, part number, 0357480210, and male crimp terminal, part number, 0357450210, wherein part numbers 0357480210 and 0357450210 may accept and crimp to a 14 AWG wire conductor. Cable 1480 may comprise a ground conductor, a neutral conductor and a hot conductor, and may be manufactured to meet a safety standard, such as an Underwriters Laboratories (UL) standard, and be of a service grade classification, such as an SJT classification, and may be a flame retardant rated construction, such as an FT2 rated construction. Cable 1480 may comprise a durable outer jacket, such as a polyvinyl chloride jacket, which encases ground a conductor, a neutral conductor and a hot conductor, wherein each conductor may be additionally individually jacketed with an electrically insulating jacket, such as a polyvinyl chloride jacket. The conductors may comprise a stranded copper wire and may be a suitable gauge for relocating an outlet tap on a typical 15 amp or 20 amp branch circuit, such as a 14 AWG.

Interconnect socket 1410 may comprise an outer housing 1430, a key 1432, a lock catch 1434 and a clip retention groove 1438. Interconnect plug 1420 may comprise an outer housing 1470, an inner housing 1440, a key tab 1442, a lock tab 1444, a lock release 1446, a clip retention groove 1478, a ground pin 1454, a neutral pin 1456 and a hot pin 1458, wherein pins may also refer to "male crimp terminals".

FIG. 9B is a perspective view of interconnect module 1000 wherein socket outer housing 1430 and plug outer housing 1470 may be removed from respective inner housings of interconnect socket 1410, namely, an inner housing 1460, and interconnect plug 1420, namely, inner housing 1440. Inner housing 1460 may comprise a pin socket wall 1462, wherein a ground pin socket 1464, a neutral pin socket 1466 and a hot pin socket 1468—which are not visible—may abut an underside of pin socket wall 1462 and may be accessible by a pin inserted through a hole in pin socket wall 1462. Pin sockets 1464, 1466 and 1468 may also refer to "female crimp terminals." Inner housing 1440 may comprise, lock tab 1444, lock release 1446, a slit 1450 and a slit 1452. Slits 1450 and 1452 may permit a travel inward of lock tab 1444 when lock release 1446 is pressed inward. A thinning of the wall of housing 1440 above lock release 1446 and between slits 1450 and 1452 may facilitate an easier actuation of a lock release action. Pins 1454, 1456 and 1458 protrude downward through a pin wall (not visible) of inner housing 1440. Cable 1480 may comprise a retention ring 1482 which may be secured to cable 1480, such as by crimping, and be situated such that when outer housing 1470 is assembled to inner housing 1440, retention ring 1482 is retained within outer housing which may comprise a cable hole 1472 which may be of sufficient geometry to allow cable 1482 to move through cable hole 1472 but not retention ring 1482, thereby strain relieving crimp connections between conductors comprised by cable 1480 and male crimp terminals (namely, pins 1454, 1456 and 1458) comprised by inner housing 1440. A similar arrangement of a retention ring secured to cable 1480 and situated within inner housing 1460, and a cable hole in outer housing 1430 may strain relieve crimp connections between conductors comprised by cable 1480 and female crimp terminals (namely, pin sockets 1464, 1466 and 1468) comprised by inner housing 1460.

FIG. 9C is a perspective view of a mounting plate 1490 configured to receive an interconnect socket 1410 of a first interconnection module 1400 mated with an interconnect plug 1420 of a second interconnection module. Mounting plate 1490 comprises attachment holes 1492 and may be mounted to a surface, such as surface 110 (FIGS. 1A, B, and C and FIGS. 4A, B and C), via one or more attachment holes, such as attachment holes 1492, using fasteners suitable for the underlying construction of surface 110, such as by using drywall anchors, toggle bolts, butterfly bolts, molly anchors, woodscrews, concrete anchors, and the like. Alternatively or additionally, and depending on a suitable surface, two-sided adhesive strips, such as a 3M Command™ Strips marketed by 3M Corporation, may be placed between mounting plate 1490 and surface 110 to secure or further secure mounting plate 1490 to surface 110. Mounting plate 1490 comprises retention clips 1494 which engage with clip retention grooves 1438 and 1478 of interconnect socket 1410 and interconnect plug 1420, respectively. Note that FIG. 4A, FIG. 4B and FIG. 4C illustrate example implementations of mounting plates 172*a*, 172*b* and 174, wherein each mounting plate 172*a*, 172*b* and 174 may comprise retention clips which may retain interconnect modules 862*a*, 862*b*, 862*c*, 864, 873 and 874 by retention grooves which may be comprised thereby.

FIG. 9D is a perspective view of two interconnected flexible interconnect modules 1400*a* and 1400*b* comprising a modular interconnection of an interconnect plug 1420*b* of a module 1400*b* plugged into an interconnect socket 1410*a* of module 1400*a*. A lock tab 1444*b* of module 1400*b* may engage with a lock catch 1434*a* of module 1400*a*, thereby securing module 1400*a* together with module 1400*b*, and electrically interconnecting a ground pin 1454*a* to a pin socket 1464*b*, a neutral pin 1546*a* to a pin socket 1466*b*, and a hot pin 1458*a* to a hot pin socket 1468*b*. Pressing a lock release 1446*b* of module 1400*b* may cause lock tab 1444*b* of module 1400*b* to travel inward and disengage from lock catch 1434*a* of module 1400*a* and permit a separation of module 1400*a* and module 1400*b*. Not visible in FIG. 9D is the keying feature disclosed in prior implementations of interconnect modules, but can be seen in FIG. 9A and FIG. 9B. Outer housing of interconnect socket 1410*a* may comprise key and outer housing of interconnect plug 1420*b* may comprise a key tab engaged with the key of interconnect socket 1410*a*, wherein an interconnection of interconnect socket 1410*a* and interconnect plug 1420*b* in a rotated orientation of 180 degrees is prevented by a misalignment of key tab of interconnect plug 1420*b* and key of interconnect socket 1410*a*. Mated interconnect socket 1410*a* and interconnect plug 1420*b* may be secured to mounting plate 1490, wherein retention clip 1494 may engage with clip retention grooves 1438*a* and 1478*b* of interconnect socket 1410*a* and interconnect plug 1420*b*, respectively.

As noted earlier, in some implementations, interconnect modules may be provided in various types, such as: various lengths; various colors; various constructions, including flexible construction and rigid construction; and the like. For example, lengths may vary from inches to many feet, such as for example 6 inches to 6 feet or 10 feet or more. Conductors within interconnect modules may be flexible, jacketed/insulated stranded copper conductors and may terminate in terminals, such as soldered or crimped terminals (the latter as described in conjunction with module 1400), or may be solid conductors terminated in pins and pin sockets (as described in conjunction with modules 1000 and 1200). Components which may restrict access to electrical power, such as to restrict unintentional contact with an electrified component, and/or components which provide mechanical strength or support may be constructed of an electrically insulating, durable and rigid material, such as for example, an electrically insulating plastic resin, and may be manufactured, for example, using a thermoforming process such as an injection molding process, and may be manufactured of an Underwriters Laboratories (UL) recognized flame retardant material, such as a UL 94V-0 (burning stops within 10 seconds on a vertical specimen; drips of particles allowed as long as they are not inflamed) rated material. Other components which are configured to conduct electrical power, may be constructed of metals, such as a stranded copper, where a flexibility may be desirable, such as in conductors comprised by flexible cables or raceways, or brass which is a harder metal than copper, and may be desirable for components where low wear and durability are required, such as pins, sockets, prongs and the like, and may be configured to provide a low impedance electrical path and have a capacity to conduct 15 amperes of electrical current when connected to an existing outlet of a branch circuit.

In some implementations and as depicted in a variety of implementations herein, interconnect modules of a modular interconnect may comprise an interconnect socket and an interconnect plug, an input unit may comprise an interconnect socket, and an output unit may comprise an interconnect plug, wherein each interconnect plug may be connected to an interconnect socket and thereby complete an electrical circuit between an electrical plug of an input unit and an electrical receptacle of an output unit. In some implementations, an electrical apparatus may comprise interconnect plugs comprising pins and interconnect sockets comprising pin sockets housed within electrically insulating material and accessible only by objects comprising small geometries, such as geometries identifiable as "pin shaped", wherein the interconnect sockets comprise a shroud for receiving an interconnect plug, and pins of an interconnect plug may not be concurrently electrically energized by contact with pin sockets of an interconnect socket and be exposed outside of an interconnect plug covered shroud of the interconnect socket, such that a safe management of electrical power distribution may be maintained. For example and referring to FIG. 9A and FIG. 9B, an interconnect socket 1410 may comprise a shroud formed by an outer housing 1430 having a recessed inner housing 1460 therein. An interconnect socket 1410 and an interconnect plug 1420 may be configured such that an inner housing 1440 of an interconnect plug of a first module 1400 is at least partially penetrating a shroud (or in other words, is at least partially entering an outer housing 1430) of an interconnect socket 1410 of a second module 1400, prior to a pin 1454, 1456 or 1458 making contact with a pin socket 1464, 1466 or 1468, such that an electrified pin is not accessible outside of an enclosed interconnect socket.

A number of implementations of a user configurable electric power distribution apparatus, electrical apparatus and modular electrical apparatus have been described. Various modifications may be made without departing from the spirit and scope of the disclosed user configurable electric power distribution apparatus.

The present disclosure is not to be limited in terms of the particular implementations described in this application, which are intended as illustrations of various aspects. Moreover, the various disclosed implementations can be interchangeably used with each other, unless otherwise noted. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. It is also to be understood that the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

A number of implementations of the user configurable electric power distribution apparatus have been described. Various modifications may be made without departing from the spirit and scope of the invention.

What is claimed is:

1. An electrical apparatus comprising:
    an input unit comprising an electrical plug, wherein the input unit is pluggable into an electrical outlet and conceals the electrical outlet when plugged therein;
    an output unit comprising at least one electrical receptacle, wherein the output unit and the input unit are not conjoined and the output unit can be located on a surface when the input unit is plugged into the electrical outlet, and the output unit can be separated by a distance from the input unit; and
    an electrical interconnect attached to both the input unit and the output unit, wherein:
        electrical power received by the electrical plug can be available at the at least one electrical receptacle via an electrical circuit comprising at least portions of the electrical plug, at least portions of the electrical interconnect and at least portions of the at least one electrical receptacle;
        the electrical interconnect is a modular electrical interconnect and comprises at least one interconnect module and a plurality of modular interconnections, wherein the modular interconnections can be disconnected and reconnected; and
        at least one modular interconnection comprises a lock, wherein the lock locks an interconnect plug to an interconnect socket.

2. The apparatus of claim 1, wherein the lock is releasable by actuating a lock release and the interconnect plug can be disconnected from the interconnect socket when the lock release is actuated.

3. The apparatus of claim 1, wherein the at least one interconnect module comprises an interconnect socket and an interconnect plug, the input unit comprises an interconnect socket, and the output unit comprises an interconnect plug, wherein each interconnect plug may be connected to an interconnect socket and thereby complete an electrical circuit between the electrical plug and the at least one electrical receptacle.

4. An electrical apparatus comprising:
    an input unit comprising an electrical plug, wherein the input unit is pluggable into an electrical outlet and conceals the electrical outlet when plugged therein;
    an output unit comprising at least one electrical receptacle, wherein the output unit and the input unit are not conjoined and the output unit can be located on a surface when the input unit is plugged into an electrical outlet, and the output unit can be separated by a distance from the input unit;
    an electrical interconnect attached to both the input unit and the output unit, wherein:
        electrical power received by the electrical plug can be available at the at least one electrical receptacle via an electrical circuit comprising at least portions of the electrical plug, at least portions of the electrical interconnect and at least portions of the at least one electrical receptacle;
        the electrical interconnect is a modular interconnect and comprises at least one interconnect module and a plurality of modular interconnections, wherein the modular interconnections can be disconnected and reconnected without the use of tools;
        the plurality modular interconnections comprise locks which lock an interconnect plug to an interconnect socket, wherein the locks are releasable by actuating a lock release and the interconnect plug can be disconnected from the interconnect socket when the lock release is actuated; and
        interconnect plugs comprise pins and interconnect sockets comprise shrouds having an interior for receiving an interconnect plug and pins of an interconnect plug, wherein pins of an interconnect plug cannot be electrically energized unless the interconnect plug is obstructing access to the interior of a shroud of an interconnect socket; and
    a ground fault circuit interrupter (GFCI) which resides in the electrical circuit and is configured to interrupt availability of electrical power at the at least one electrical receptacle upon a ground fault condition affecting an electrical current flowing into the electrical plug, wherein:
        a portion of the electrical circuit is between the electrical plug and the GCFI, and a portion of the electrical circuit is between the GFCI and the at least one electrical receptacle, and includes the at least portions of the at least one electrical receptacle;
        electrical power available at the electrical plug is unavailable to the electrical circuit between the GFCI and the at least one electrical receptacle, and the at least portions of the at least one electrical receptacle, when the availability of electrical power is interrupted;
        the GFCI is comprised by the input unit, and can interrupt the availability of electrical power to the at least portions of the electrical interconnect and the at least portions of the at least one electrical receptacle comprised by the electrical circuit; and
        the input unit further comprises a GFCI test and a GFCI reset.

* * * * *